United States Patent [19]
Otomo

[11] Patent Number: 5,877,422
[45] Date of Patent: Mar. 2, 1999

[54] TERMITE DETECTION APPARATUS AND TERMITE ALARM UNIT EMPLOYING THIS TERMITE DETECTION APPARATUS

[75] Inventor: Hirotaka Otomo, Tokyo, Japan

[73] Assignee: Cats, Inc., Tokyo, Japan

[21] Appl. No.: 670,852

[22] Filed: Jun. 28, 1996

[30] Foreign Application Priority Data

Dec. 19, 1995 [JP] Japan .................................. 7-348778
Feb. 22, 1996 [JP] Japan .................................. 8-060173

[51] Int. Cl.⁶ .............................. A01M 1/20; G01N 29/14
[52] U.S. Cl. .......................... 73/587; 43/124; 43/132.1; 340/573
[58] Field of Search .................... 43/124, 132.1; 73/587; 340/573

[56] References Cited

U.S. PATENT DOCUMENTS

| | | | |
|---|---|---|---|
| 3,564,750 | 2/1971 | Burgess | 43/132.1 |
| 4,671,114 | 6/1987 | Litzkow | 73/587 |
| 4,809,554 | 3/1989 | Shade | 73/587 |
| 4,937,555 | 6/1990 | Litzkow | 73/587 |
| 4,941,356 | 7/1990 | Pallaske | 73/587 |
| 4,991,439 | 2/1991 | Betts | 73/587 |
| 5,005,416 | 4/1991 | Vick | 73/587 |
| 5,285,688 | 2/1994 | Robbins | 73/587 |
| 5,329,726 | 7/1994 | Thorne | 43/124 |
| 5,473,942 | 12/1995 | Vick | 73/587 |
| 5,571,967 | 11/1996 | Tanaka | 73/587 |
| 5,575,105 | 11/1996 | Otomo | 43/132.1 |
| 5,592,774 | 1/1997 | Galyon | 43/124 |

*Primary Examiner*—Kurt Rowan
*Attorney, Agent, or Firm*—Wenderoth, Lind & Ponack, L.L.P.

[57] ABSTRACT

In order to provide a termite detection apparatus that is capable of detecting an infestation of termites in a reliable manner and a termite alarm unit that employs this termite detection apparatus, the termite detection apparatus according to the present invention comprises a sensor section. The sensor section comprises a case, an attractant member provided inside the case and a detection portion provided with a for detection mechanism where the attractant member is provided to detect termites that have entered, attracted by the attractant member. The termite detection apparatus also includes a sensor cover enclosing an area around the sensor section. In addition, the termite alarm unit gathers termite detection signals sent from a plurality of such termite detection apparatuses at a relay device, sends the termite detection signals gathered at the relay device to an alarm section as a termite presence signal so that a warning can be issued to the resident with a voice produced at an audio alarm section and with a visual indication made at a visual alarm section.

21 Claims, 19 Drawing Sheets

TERMITE DETECTION APPARATUS AND TERMITE ALARM UNIT EMPLOYING THIS TERMITE DETECTION APPARATUS

BACKGROUND OF THE INVENTION

1. Field of the Invention

The present invention relates to a termite detection apparatus that detects termite activity in a building and issues an alarm to the outside, and a termite alarm unit that employs this termite detection apparatus.

2. Description of the Related Art

Conventionally, an investigation as to whether or not a house is infested with termites is performed through visual inspection by an inspector who crawls under the floor at the request of a home owner. In addition, since such an investigation is normally requested by the home owner after termites have been discovered at a portion of the house that has already been damaged, by the time the actual investigation for termites occurs, damage by termites will have been in progress for a considerable time.

To deal with the problem discussed above, the applicant of the present invention disclosed a termite alarm unit in Patent Application No. H6-170134 dated Jun. 29, 1994 (Japanese Unexamined Patent Publication No. H8-9860). The termite alarm unit disclosed in this application comprises a sensor section constituted with a cellulose containing member that is provided with a plurality of through holes extending transversely, each hole having one opening end provided with an emitting element and the other opening end provided with a receiving element, a judgment section for detecting an infestation of termites to provide an output signal in response to the obstruction of an output wave from the emitting element to be received by the corresponding receiving element and an alarm display section for issuing an alarm in response to output from the judgment section.

Also, Japanese Unexamined Patent Publication No. H6-205632 (Declaration of Priority No. 941460, priority date: Sep. 8, 1992, Declaration of Priority filed in: USA) discloses a unit that monitors for termite activity, determines the degree of infestation and arrests the infestation when termite activity is detected. The unit disclosed in this publication comprises an external housing 2, which is permanently buried underground at a specific depth, and a cartridge 12 provided inside the housing in such a manner that it can be removed, with a hole 4 formed in the external housing 2 and a hole 14 formed in the cartridge 12 positioned so as to become aligned with each other when the cartridge 12 is mounted inside the external housing 2. In addition, this publication discloses that initially, the cartridge 12 containing a non-toxic bait material, is mounted inside the external housing 2 in order to diagnose the level of the infestation of termites and is regularly taken out to check for termite activity and that when termite activity is detected, the cartridge 12 mounted inside the external housing 2 is charged with a toxic bait material instead of the non-toxic bait material in order to prevent the infestation from spreading.

The unit disclosed in Japanese Unexamined Patent Publication No. H7-23684, which detects an infestation of termites in a house at an early stage and enables prompt countermeasures to be taken by sending the results of the detection to the manager of a center via a telephone line, comprises a detection terminal 2 and a detection sample 1 to which the detection terminal 2 applies a specific level of pressure. When the detection sample 1 begins to disintegrate from being eaten away by termites, the displacement of the detection terminal 2, which occurs as the detection terminal 2 caves in toward the detection sample 1, is detected. In particular, the displacement of the detection terminal 2 is detected by a magnetic sensor 7.

The invention disclosed in Japanese Unexamined Patent Publication No. H7-115887, which was filed by the same applicant as that of the invention disclosed in the Japanese Unexamined Patent Publication No. H7-23684 described above, is characterized, in addition to the basic structure disclosed in Japanese Unexamined Patent Publication No. H7-23684, by the following: a gap provided in the fitting area between the woody portion for detection and the case; the woody portion for detection is in the form of a plate with pressure applied in a direction that is at a right angle to the cross grain surface; pheromones employed as the attractant for termites; and in particular, in regard to the magnetic sensor: a 52 alloy or the like, with a high magnetic permeability and low level of residual magnetism is employed for the metal plate which constitutes the magnetic circuit and a structure for shielding magnetism provided at the external circumference of the magnetic circuit.

Japanese Unexamined Patent Publication No. H7-255344 discloses a unit which detect vibrations that occur when termites eat a substance such as a piece of wood for detection. This unit is provided with, in the sensor main body, a means for placing a substance that constitutes a desired food for termites near the path of infestation of termites and a means for detecting vibrations that occur when the termites eat the substance or the vibrations that occur as a result of termite activity. To be more specific, the termite sensor disclosed in this publication comprises a sensor external frame; a battery to function as a power source; a vibration sensor for detecting vibrations; a signal processing circuit for amplifying and processing signals sent from the vibration sensor; a lever that communicates vibrations to the vibration sensor; woody material as bait for termites; a spring for holding the woody material in contact with the lever; a bait table and a sensor bottom portion.

In addition to the structural features disclosed in Japanese Unexamined Patent Publication No. H7-23684 described above, the unit disclosed in Japanese Unexamined Patent Publication No. H7-274792 is further provided with a means for supplying moisture to the woody material which is used as a detection sample, in order to increase the effectiveness of detection by taking advantage of the termites' affinity for moist wood.

A termite detection apparatus disclosed in Japanese Unexamined Patent Publication No. H7-143837 comprises two acoustic sensors which convert the sound of termite activity to electrical signals, a subtraction processing device which performs subtraction processing for signals provided by these acoustic sensors and a comparator which outputs signals upon which the subtraction processing has been performed and which are at a level higher than a specific threshold value, as termite detection signals, in order to enable accurate detection of termites without being affected by noise from the outside.

SUMMARY OF THE INVENTION

Among the examples cited above, the unit disclosed in Japanese Unexamined Patent Publication No. H6-205632 has a problem in that, since termites are detected by visual inspection, necessitating an inspector to patrol the house where the unit is installed, a great deal of time and expense are required for inspection.

In addition, with the units disclosed in Japanese Unexamined Patent publication No. H7-23684 and Japanese Unexamined Patent Publication No. H7-274792, there is a problem in that a long period of time must elapse before termites eat away at the detection sample enough that it becomes fragile from being eaten away by termites. Another problem that we can anticipate is that, since termites dislike contact with the outside air, only the inside of the detection sample is eaten away and, if the external frame portion of the detection sample remains intact, the detection sample may end up supporting the detection terminal even during a termite infestation.

The unit disclosed in Japanese Examined Patent Publication No. H7-115887, too, has a problem in that a long period of time must elapse before the push rod for detection becomes displaced due to the deterioration of the woody portion for detection. Moreover, when the woody portion is in a plate form, it may induce erroneous operation if it becomes fragile due to rotting.

Moreover, with the units disclosed in Japanese Unexamined Patent Publication No. H7-255344 and Japanese Unexamined Patent Publication No. H7-143837, which detect vibrations caused by the sound that termites make when eating or the sound of other termite activity, it is highly likely that erroneous operation will be induced by sounds communicated through the ground, such as noise of vibrations coming from the motors of the outdoor units of air conditioners, washing machines, refrigerators and the like, the noise of passing vehicles and noise from the vibration of water running through supply pipes or drain pipes. Thus, when installing the unit, it is necessary to select a location where such erroneous operation will not occur and this places restrictions on the installation location of the unit.

Therefore, objects of the present invention are to provide a termite detection apparatus that is capable of detecting an infestation of termites reliably and to provide a termite alarm unit that is capable of reliably informing the resident of the results of detection made by the termite detection apparatus, by addressing the problems of the prior art discussed above and by further developing the invention by this applicant, for which an application has been previously submitted.

Accordingly, the termite detection apparatus according to the present invention comprises a sensor section constituted with a case that is placed at a specific location under the floor of, or around a house and is provided with an opening portion at the lower end, an attractant member that is exposed from the opening portion of the case and a detection portion provided at the attractant member, which includes a means for detection that detects termites that have been attracted to the attractant member and a sensor cover that encloses an area surrounding the sensor section.

Thus, in the termite detection apparatus according to the present invention, since the sensor section is constituted with a case, an attractant member provided inside the case and a detection portion provided with a means for detection at the attractant member, and a sensor cover for enclosing an area surrounding the sensor section is provided, termites that have been attracted to the attractant member and have entered the apparatus can be detected with the means for detection. At the same time, the sensor cover prevents infestation by other insects, making it possible to reliably detect an infestation of termites. In addition, since the attractant member and the detection portion are further housed in the case, the means for detection can be protected from moisture and the like, enabling operation for an extended period of time.

Also, since the attractant member is constituted with a member that contains cellulose, a favorite termite food, termites are attracted reliably. In addition, with the attractant member extended out at a specific width from the opening portion of the case, the attractant member can be embedded in the ground at a specific width, facilitating the attraction of the termites in the ground, who do not like dryness, to the attractant member, thus improving the detection rate of termites.

Furthermore, since the area between the attractant member and the opening portion of the case is sealed with a sealing member to protect the means for detection provided inside the case from moisture in the ground, the service life of the apparatus is extended, making it possible to detect termites over a long period of time.

Moreover, with a plurality of induction holes formed in the attractant member opening at the lower surface of the attractant member, termites can enter the attractant member with ease, facilitating the detection of termites.

Also, according to the present invention, the attractant member is divided into a first attractant member and a second attractant member, which together, clamp the detection portion, with the first attractant member provided extending out at a specific width from the opening portion and a plurality of induction holes opening at its lower surface. With this, since termites that have been attracted to the first attractant member pass the detection portion while moving on to the second attractant member, the detection of termites is facilitated.

In addition, the detection portion is provided with first holes communicating with the induction holes and second holes intersecting the first holes and a means for detection constituted with an emitting element and a receiving element positioned at each of the second holes so that the output wave emitted from an emitting element is changed when a termite, having been guided into an induction holes, passes a first hole, which communicates with the induction hole, thereby enabling the detection of the presence of termites. Note that the output wave may be a light wave, an electromagnetic wave or a sound wave.

Moreover, with the detection portion formed with a synthetic resin at a specific hardness, it can be ensured that when termites move from the first attractant member to the second attract member, they pass the first holes without fail, enabling reliable detection of entering termites.

Furthermore, with an indicator portion indicating the operating state of the sensor section provided at the sensor cover, it can be visually verified whether or not the termite detection apparatus is operating and, with the indicator portion changing when termites are detected, the location of the termite infestation can be specified.

In another alternative, the termite detection apparatus according to the present invention may comprise a sensor section constituted with a case which is placed at a specific position under the floor of, or around the house and is provided with an opening portion at the lower end, a first attractant member extending out at a specific width from the opening portion of the case, which is provided with a plurality of induction holes opening at the lower surface, a detection portion positioned above the first attractant member, which is provided with first holes communicating with the induction holes and second holes that intersect the first holes and are each provided with a means for detection constituted with an emitting element and a receiving element, a second attractant member positioned above the detection portion and a sealing member which seals the area between the case and the first attractant member. The termite detection apparatus further includes a sensor cover enclosing an area surrounding the sensor section, which is provided with an indicator portion to indicate the operating state of the sensor section.

In this structure, when termites in the ground are attracted toward the induction holes of the first attractant member embedded in the ground at a specific depth and the termites thus attracted to the first attractant member are further induced to the second attractant member, they must pass through the first holes communicating with the induction holes, changing the output wave emitted from the emitting elements at the means for detection. Thus, since the first attractant member is buried in the ground at a specific depth, termites, avoiding dryness, are more likely to be attracted to the first attractant member. In addition, with the sealing member sealing the area between the case and the first attractant member in the sensor section, the inside of the case is sealed and the electrical parts and the like can be protected from humidity, even in an environment with high humidity where the termite detection apparatus is likely to be installed, enabling the detection of termites over a long period of time. Furthermore, with the indicator portion for indicating the operating state of the sensor section provided at the sensor cover, whether or not the sensor section is operating can be visually verified easily and, with the indication for the sensor section that has detected termites changing, the location of the termite infestation can be specified.

Moreover, by scattering attractant chips around the sensor section, the rate of attracting termites is improved. In addition, by securing the sensor section of the termite detection apparatus at the ground surface with a plurality of piles mounted at the attractant member, the sensor section is prevented from falling down or tilting, ensuring reliable detection of termites by the sensor section.

Also the termite alarm unit according to the present invention comprises a termite detection apparatus that includes a sensor section constituted with a case to be positioned at a specific location under the floor of, or around a house and is provided with an opening at the lower end, an attractant member that is exposed from the opening portion of the case and a detection portion positioned at the attractant member, which is provided with a means for detection that detects termites that have been induced by the attractant member. The termite detection apparatus further includes a sensor cover that encloses an area surrounding the sensor section. The termite alarm unit also includes a relay device that collects termite detection signals from a plurality of termite detection apparatuses to output a termite presence signal and an alarm section to be installed at a specific location, which receives the termite presence signal from the relay device and is constituted with an audio alarm section for issuing a voice alarm to indicate the presence of termites and a visual alarm section to indicate the presence of termites.

In this structure, at the sensor section placed at a specific position under the floor of, or around the house, termites attracted by the attractant member are detected by the means for detection and termite detection signals from a plurality of termite detection apparatuses are gathered at the relay device. The termite detection signals gathered at the relay device are then sent to the alarm section as a termite presence signal, where a warning is issued with a voice at the audio alarm section and also with an indication at the visual alarm section to inform the residents of an infestation of termites. In this case, while it is desirable to install the alarm section at a conspicuous location over the floor, it is not desirable from a visual point of view to directly connect a plurality of termite detection apparatuses to it since this will involve a complex of wiring. To deal with this problem, the relay device is installed at an unobtrusive location (a specific position under the floor of, or around the house, for instance) and the various termite detection apparatuses can be connected via this relay device, requiring only one wire connecting the relay device with the alarm section and improving the visual aspect of the system. In addition, since the wiring from the various termite detection apparatuses are not required to be on the surface of the floor, wiring work under the floor of, or around the house is facilitated.

The present invention also provides a termite detection apparatus provided with a means for visual verification of the physical traces of infestation of termites.

Accordingly, the present invention comprises a case to be placed at a specific position under the floor of, or around a house, which is provided with an opening portion at its lower end, a first attractant member projecting out at a specific width from the opening portion of the case, which is provided with a plurality of induction holes opening at the lower surface, an electrical detection portion placed above the first attractant member, which is provided with first holes communicating with the induction holes and second holes intersecting the first holes with an emitting element and a receiving element facing opposite each other across the first hole, a second attractant member positioned above the electrical detection portion and a sealing member that seals the area between the case and the first attractant member. The present invention is further provided with a means for trace detection that detects physical traces of infestation of termites, located between the first attractant member and the electrical detection portion and this means for physical trace detection is constituted with film.

Consequently, according to the present invention, by providing the film to constitute the means for physical trace detection between the first attractant member and the electrical detection portion with this film blocking the end portions of the induction holes formed in the first attractant member, when termites enter and reach the electrical detection portion, the film will have been broken by the termites. Thus, by visually checking for damage to the film by looking through the induction holes it can be ascertained if there are any physical traces of termite infestation.

In addition, if consideration for the ease of mounting the film and the ease of film preparation is paramount, it is desirable to provide the film so as to block the entire end portion including all the induction holes toward the electrical detection portion. In other words, when the film blocks all the induction holes toward the electrical detection portion, it is not necessary to restrict the opening portions of the induction holes in any particular way to facilitate the mounting of the film and, since no machining is required to create or notch an opening portion, the preparation of the film itself is facilitated. Additionally, during a reaction test of the electrical detection portion, which is conducted when the termite detection apparatus is installed, it is sometimes necessary to insert a rod for testing into one of the induction holes and this may result in a problem in that the portion of the film corresponding to the induction hole through which the rod for testing is inserted becomes damaged. However, by limiting the hole for testing to a hole at a specific position, it becomes possible to determine that damage to the film corresponding to that hole is caused by the testing and thus, the problem is solved.

Alternatively, one of the end portions of the induction holes closest to the electrical detection portion may be open.

In other words, by providing an opening or notch in the film, leaving an end portion of one of the induction holes toward the electrical detection portion uncovered, this one induction hole, which is not blocked by the film, may be used for testing, making it possible to decide on the hole for testing in advance and to distinguish between damage caused during testing and damage caused by termites.

Furthermore, it is desirable to form the film with paper or to form the film with a member containing cellulose. With this, since the film is formed using a material that is edible for termites, any problems arising from the first attractant member being separated from the second attractant member are eliminated.

BRIEF DESCRIPTION OF THE DRAWINGS

The above and other features of the invention and the concomitant advantages will be better understood by persons skilled in the field to which the invention pertains in view of the following description given in conjunction with the accompanying drawings which illustrate preferred embodiments. In the drawings.

DETAILED DESCRIPTION OF THE PREFERRED EMBODIMENTS

The following is an explanation of the embodiments according to the present invention in reference to the drawings.

Figure 1:
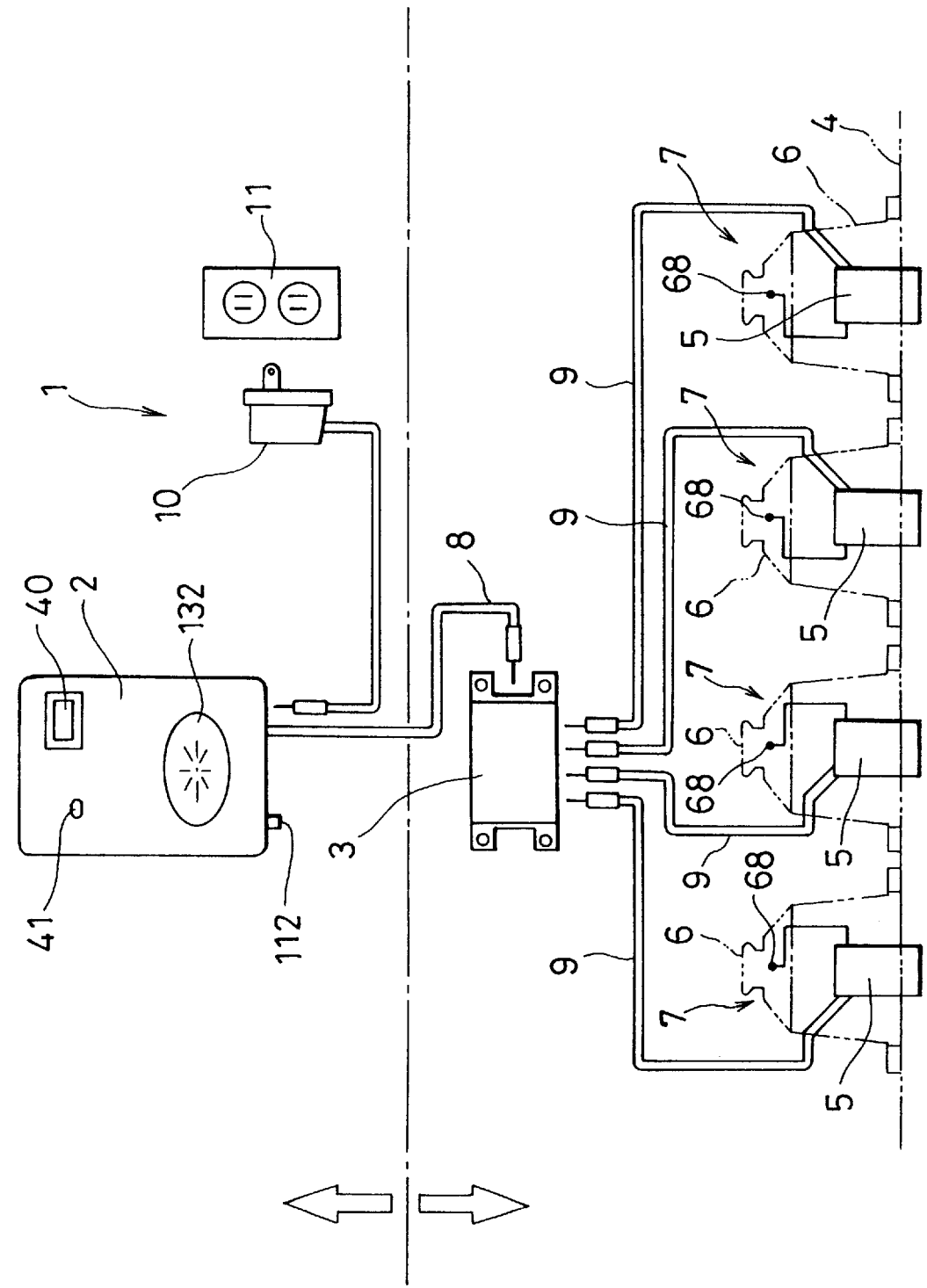
FIG. 1 illustrates a structure and layout of the termite alarm unit according to the present invention.
Figure 2:
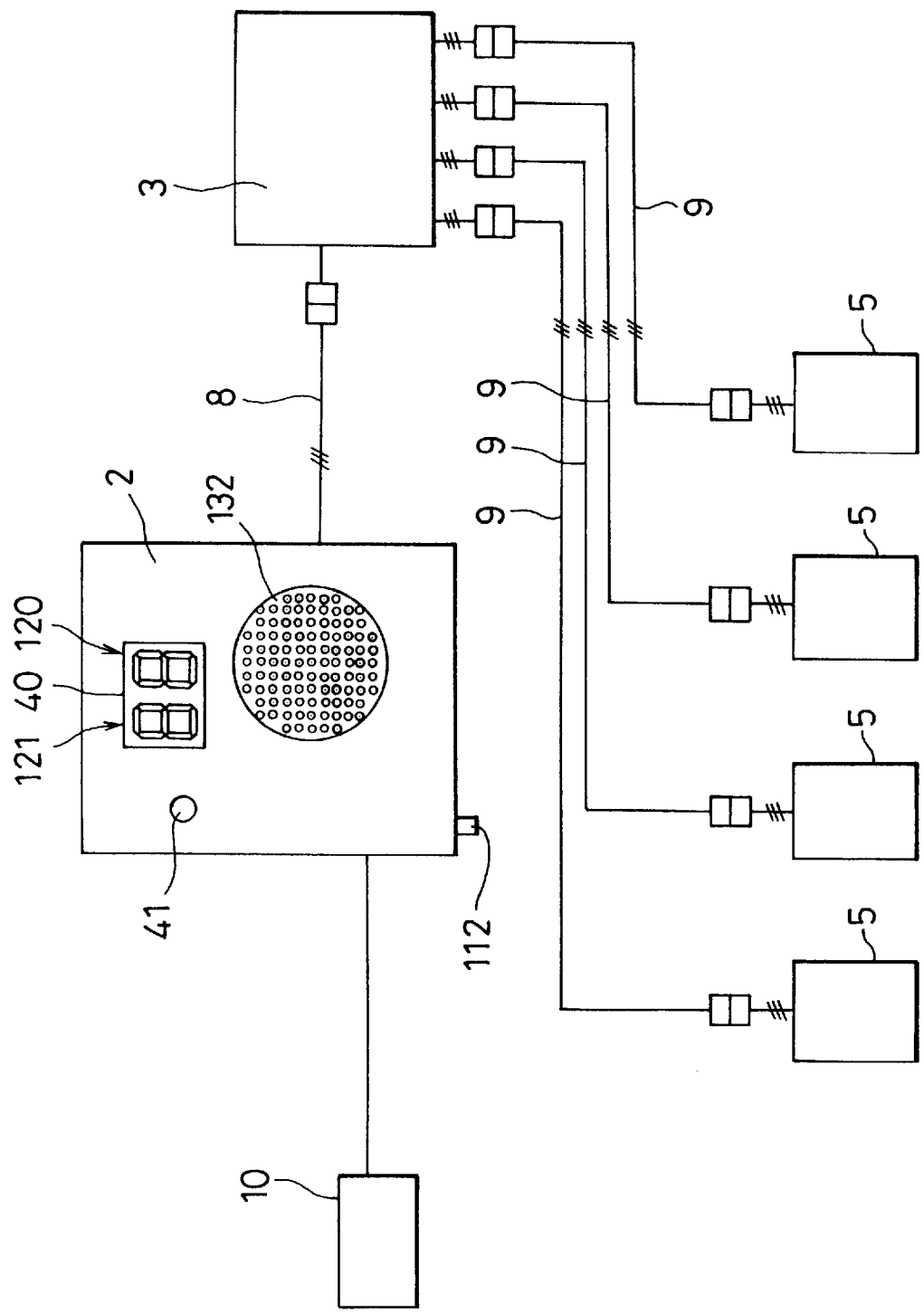
FIG. 2 is a block diagram showing the structure of the termite alarm unit according to the present invention.

A termite alarm unit 1 shown in FIGS. 1 and 2, comprises, for instance, an alarm device 2, which is installed on or above the floor inside a building, a relay device 3, which is provided at a location under the floor or in an unobtrusive location on or above the floor and a plurality of termite detection apparatuses 7 to be connected to the relay device 3 and to be provided at a specific ground surface 4 under the floor of, or around the building, each of which is constituted with a sensor section 5 and a sensor cover 6. In addition, the alarm device 2 and the relay device 3 are connected with each other via a connecting cable 8 and the relay device 3 and the various termite detection apparatuses 7 are connected via connecting cables 9. Furthermore, a 12V source voltage that has been stepped down from a standard home power electrical outlet 11 via a power adapter 10 is supplied to the alarm device 2. Note that the connecting cables 8 and 9 are both 3-wire cables consisting of a source supply line, a sensor signal line and a ground line.

Figure 3:
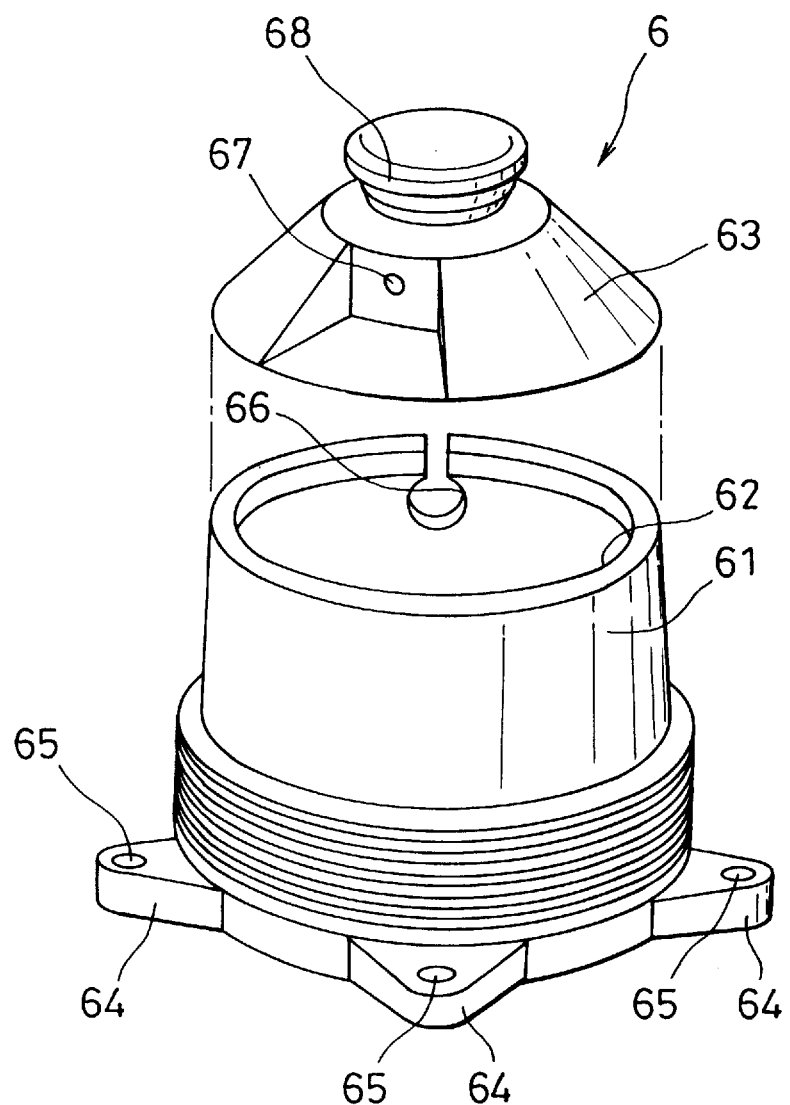
FIG. 3 is a perspective of the sensor cover of the termite detection apparatus according to the present invention.

As shown in FIG. 3, the sensor cover 6 of the termite detection apparatus 7 is constituted with a peripheral wall portion 61, inside of which a sensor section 5 is housed, with a lid portion 63 formed thereupon, which closes off an upper opening portion 62 of the peripheral wall portion 61 and, in this embodiment, the sensor cover 6 is constituted of synthetic resin. In addition, at the peripheral wall portion 61, flange portions 64, for securing the sensor cover 6 at the ground surface, are formed extending out radially from the lower end of the peripheral wall portion 61, and in each of the flange portions 64, a hole 65 is formed through which a bolt 13 (a pile or a screw may also be used) passes.

Also, a cable access hole 66 through which the connecting cable 8 is inserted and to which the connecting cable 8 is secured, is formed at a specific position on the peripheral edge of the upper end opening portion 62 of the peripheral wall portion 61. In addition, a mounting hole 67 where a light emitting diode 68, for indicating detection of termites by the sensor section 5 is provided, is formed at the lid portion 63. Note that the light emitting diode 68 is lit red when connected to the relay device 3 and goes off when the sensor section 5 has detected termites.

Figure 4A:
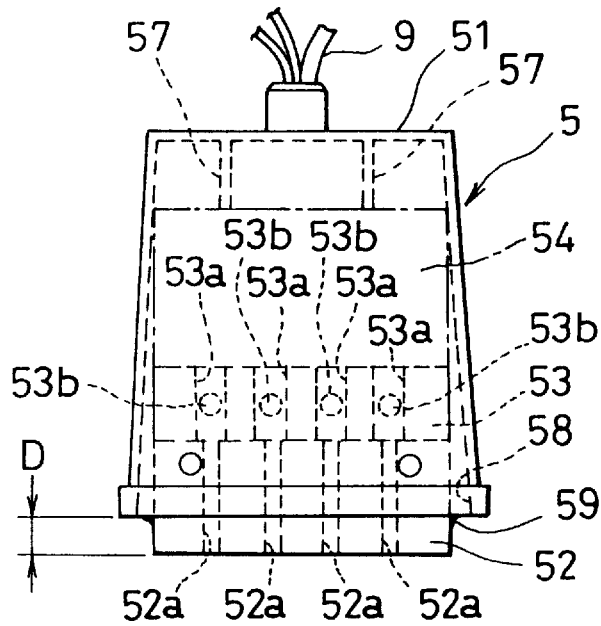
FIG. 4A is a frontal view of the sensor section of the detection section of the termite alarm unit according to the present invention.
Figure 4B:
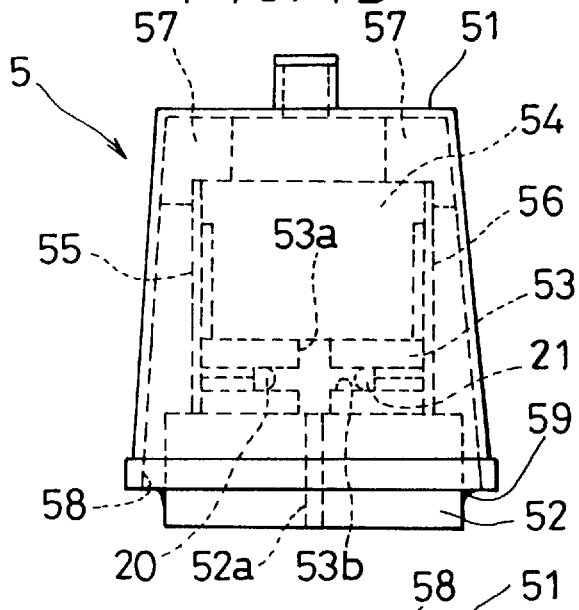
FIG. 4B is a side view of the sensor section and FIG. 4C is a bottom view of the sensor section.
Figure 4C:
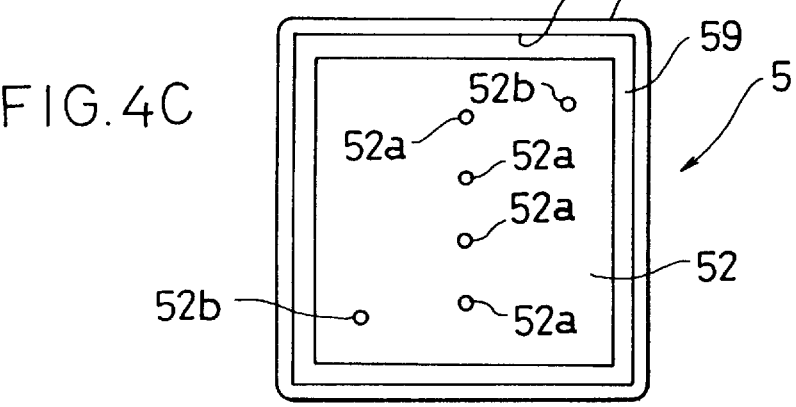
Figure 5:
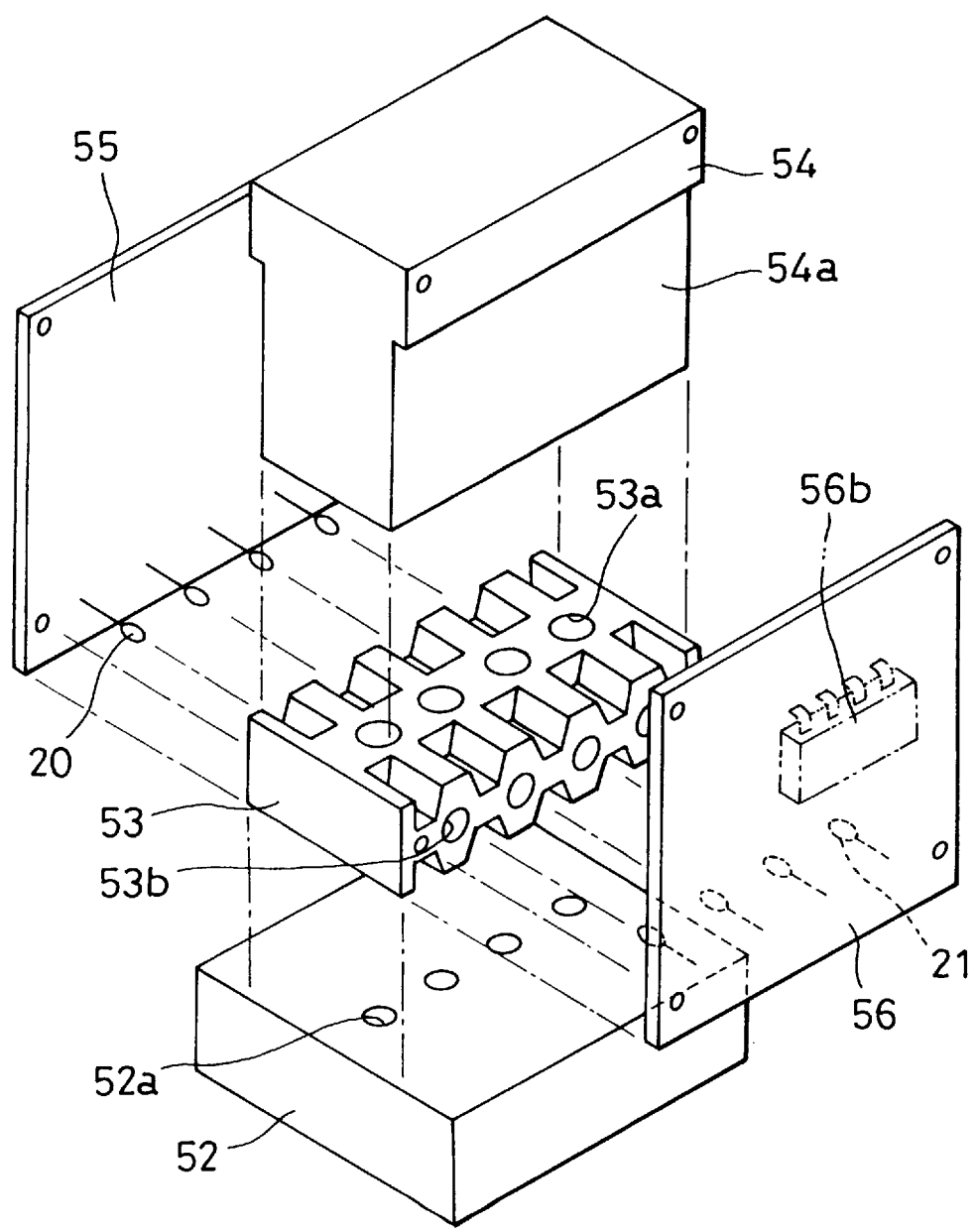
FIG. 5 is an exploded perspective showing the inside of the case of the termite detection apparatus.
Figure 7:
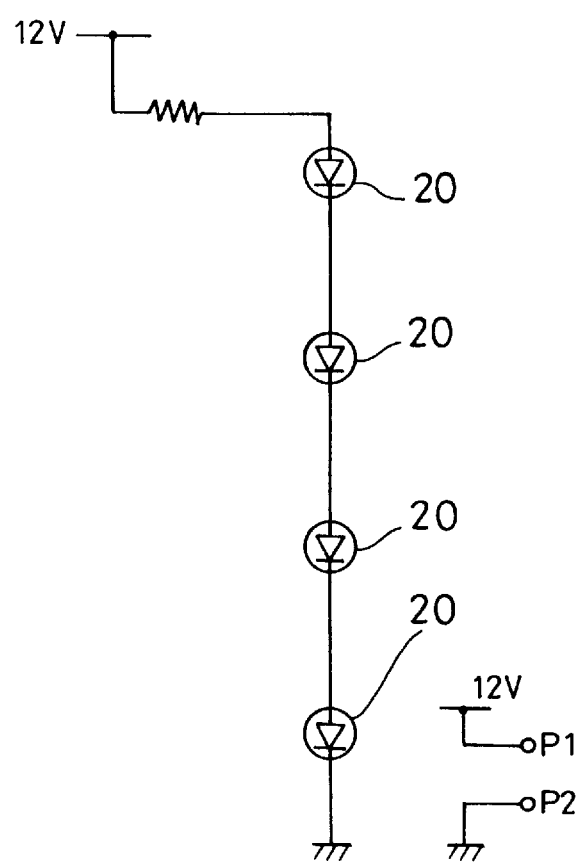
FIGS. 7 and 8 are electrical circuit diagrams of the sensor section of the termite detection apparatus.
Figure 8:
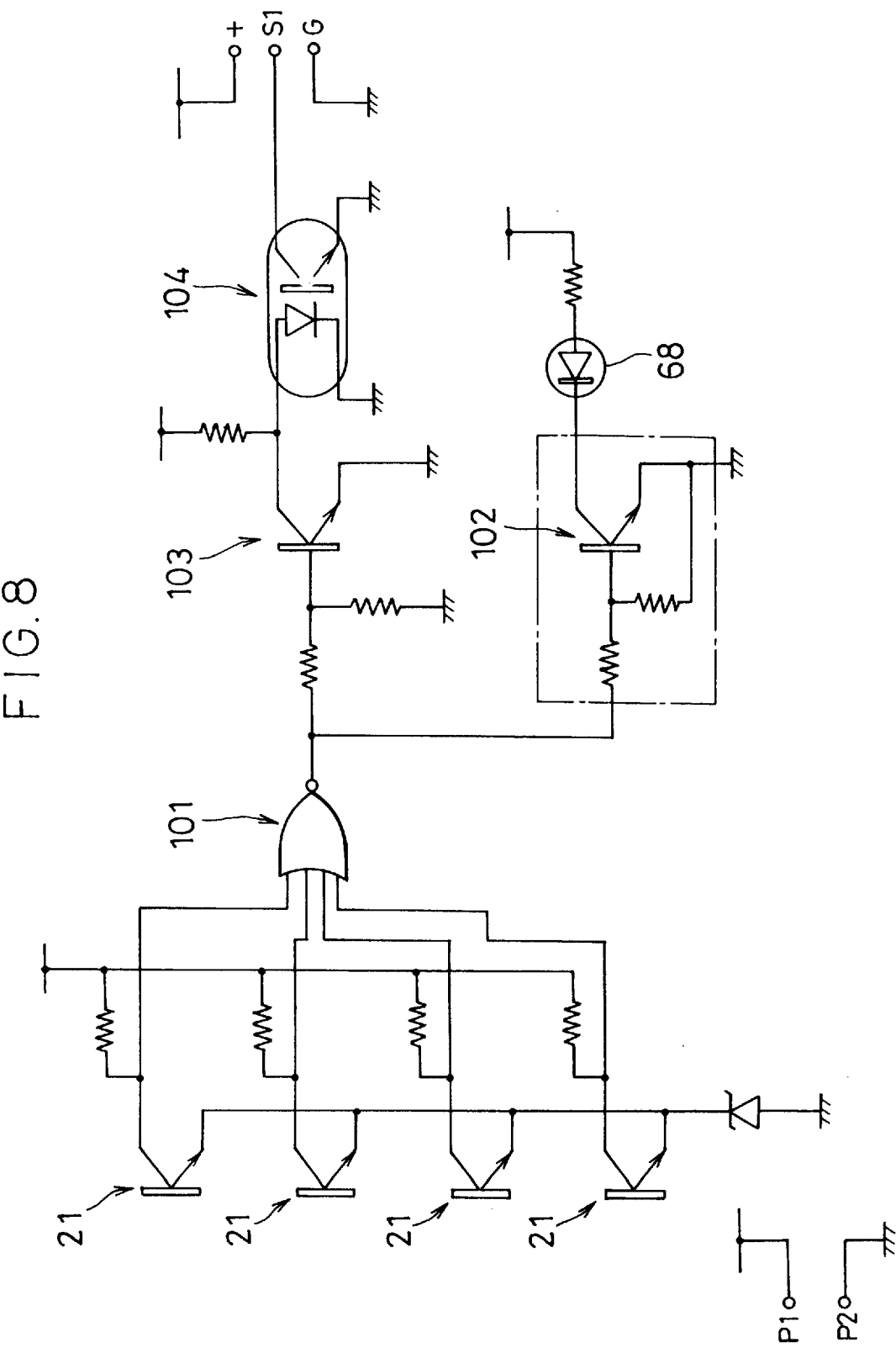

Moreover, as shown in FIGS. 4A, B and C and FIG. 5, the sensor section 5 of the termite detection apparatus 7 is provided with a cellulose containing member, i.e., a first attractant member 52, which is formed of wood in a rectangular parallelopiped shape, a detection portion 53 formed of a synthetic resin, which is placed on top of the first attractant member 52 and a second attractant member 54 formed from the same material as the first attractant member that is placed above the detection portion 53, in a case 51 constituted of synthetic resin. Also, at the two sides of the detection portion 53 and the second attractant member 54, a first circuit board 55, on which the electrical circuit shown in FIG. 7 is wired, and a second circuit board 56, on which the electrical circuit shown in FIG. 8 is wired, are secured with screws. Furthermore, notches 54a with a specific width are formed at the second attractant member 54, through which the legs of an electric component 56b, which is wired to the circuit boards 55 and 56, project out.

In addition, the upper portion of the second attractant member 54 is held in contact by a holding frame 57 formed inside the upper portion of the case 51, and the length from the top to the bottom of the laminated body of the first attractant member 52, the detection portion 53 and the second attractant member 54 is regulated by the holding frame 57 in such a manner that an end portion of the first attractant member 52 projects out from a lower end opening portion 58 of the case 51 by a specific distance D (approximately 5 mm in this embodiment). Also, the portion projecting out of the case 51 constitutes the portion of the sensor section 5 that is embedded in the ground. Note that the area between the lower end opening portion 58 of the case 51 and the first attractant member 52 is sealed with a sealing member 59 such as a resin adhesive or silicone. Holes 52b are formed in the first attractant member 52, into which piles 12 (shown in FIGS. 6A and 6B), for further securing the sensor section 5, are inserted.

Additionally, termite induction holes 52a are formed in the first attractant member 52, passing through the attractant member 52 in the vertical direction, and in the detection portion 53, first holes (longitudinal holes) 53a, which communicate with the upper ends of the induction holes 52a and second holes (transverse holes) 53b, which intersect the longitudinal holes 53a at a right angle, are formed. In this embodiment, an emitting element 20 extending out from one of the circuit boards, i.e., the circuit board 51, and a receiving element 21 extending out from the other circuit board 56 are inserted from the two ends of each transverse hole 53b so that they face opposite each other across the longitudinal hole 53a.

At the sensor section 5 of the termite detection apparatus 7 structured as described above, termites pass through the longitudinal holes 53a when they travel from the induction holes 52a of the first attractant member 52 to the second attractant member 54, blocking the output wave emitted from the emitting elements 20. This changes the output wave, which is input to the receiving element 21, enabling detection of the presence of termites. Note that by forming the detection portion 53 with a synthetic resin, it is ensured that when termites travel from the first attractant member 52 to the second attractant member 54 they are less likely to pass through areas other than the longitudinal holes 53a, increasing the likelihood of termites passing through the longitudinal holes 53a and improving the incidence of detection.

Figure 6A:
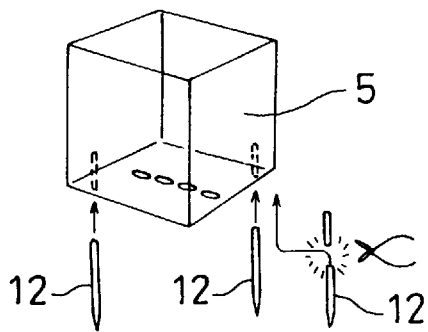
FIGS. 6A~6G illustrate stages of installation of the termite detection apparatus.

The termite detection apparatus 7 is installed under the floor of, or around the house employing the method illustrated in FIG. 6A~6G. The termite detection apparatus 7 is installed by cutting the piles 12 to a specified length and then inserting the piles 12 into the holes 52b formed at the bottom surface of the first attractant member 52, as shown in FIG. 6A.

Figure 6B:
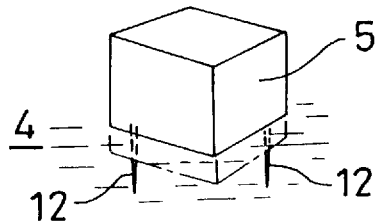
Figure 6C:
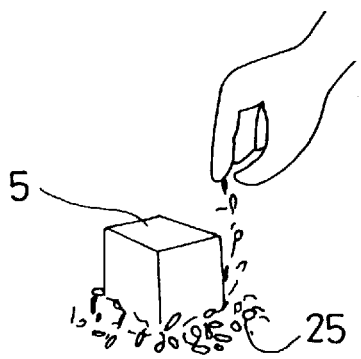

Next, as shown in FIG. 6B, the sensor section 5 to which the piles 12 are attached, is placed at a specific position under the floor of, or around the house in such a manner that it is partially embedded in the ground at a specific depth from the ground surface 4 (approximately 5 mm in this embodiment) and then, as shown in FIG. 6C, attractant chips are scattered around the sensor section 5. Note that while in this embodiment, wood chips are used as the attractant, the attractant chips may be constituted with any other material as long as they emanate an odor that termites are attracted to, for example, the odor of cellulose.

Figure 6D:
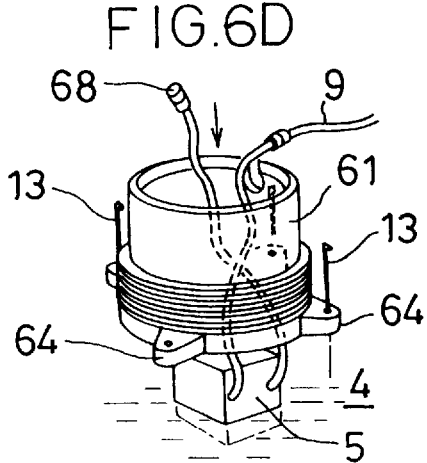
Figure 6E:
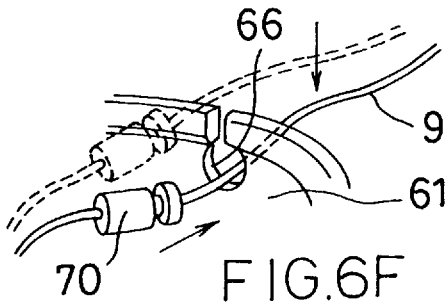

Then, as shown in FIG. 6D, the peripheral wall portion 61 of the case 6 is placed over the sensor section 5 and the sensor section 5 is secured on to the ground surface with anchoring bolts 13. After this, as shown in FIG. 6E, a connecting cable 9 is mounted through the cable access hole 66 formed at the upper end edge of the peripheral wall portion 61. Note that reference number 70 indicates a jig used for mounting the connecting cable 9 through the cable access hole 66.

Figure 6F:
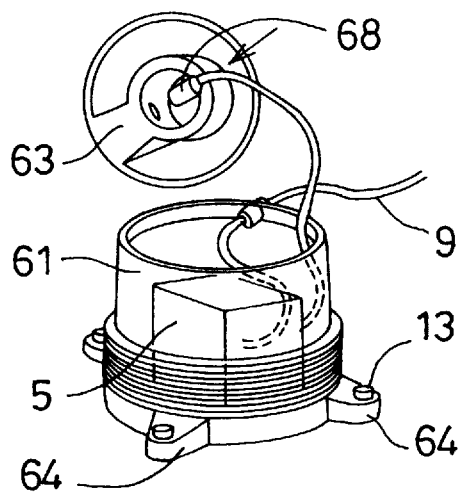
Figure 6G:
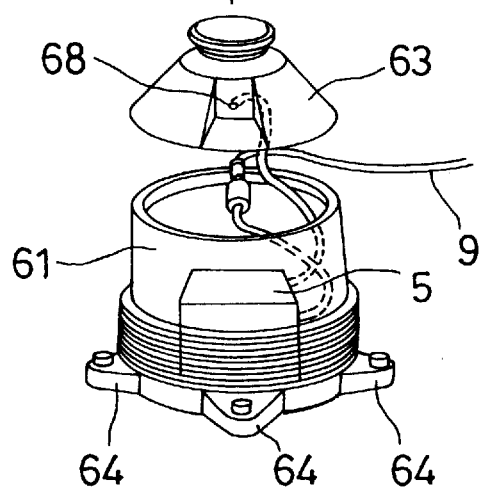

Next, as shown in FIG. 6F, the light emitting diode 68 is mounted at the mounting hole 67 formed in the lid portion 63 and finally, by fitting the lid portion 63 on to the peripheral wall portion 61, the installation of the termite detection apparatus 7 is completed, as shown in FIG. 6G.

In addition, a plurality of termite detection apparatuses 7 installed in the method described above are connected to the relay device 3 which is secured at a specific position under the floor of, or around the house, for instance, by such means as screws, via the connecting cables 9, as shown in FIG. 1. The relay device 3 is also connected to the alarm device 2 via the connecting cable 8. Then, by connecting the alarm device 2 and a source power outlet for home use with the power adapter 10, the entire installation of the termite alarm unit 1 is completed.

FIG. 7 shows the electrical circuit that is wired into one of the circuit boards, i.e., the circuit board 55 of the sensor section 5 of each termite detection apparatus 7 in the termite alarm unit 1, installed through the procedure described above. A 12V source voltage is supplied to this circuit from the alarm device 2 via the connecting cable 8, the relay device 3 and the connecting cable 9 and further, through the electrical circuit provided on the other circuit board 56 shown in FIG. 8, and an output wave (infrared ray in this embodiment) is output from the emitting element 20 extending out from one side of each transverse hole 53b. Note that in this embodiment, an infrared ray emitting diode (TLN-103, for instance) is used for the light emitting element 20.

The output wave from the infrared ray emitting diode 20 is received by the receiving element 21 provided at the opposite side of the transverse hole 53b. A phototransistor (TPS-612, for instance) is used for the receiving element 21. In the electrical circuit wired on the other circuit board 56, shown in FIG. 8, the collector of the phototransistor 21 is input to a NOR gate IC 101. A 14002, for instance, may be used for the NOR gate IC.

Thus, in a normal situation, when there are no termites, the gate of the phototransistor 21 will always be in a state in which light is being received and, therefore, the phototransistor 21 will maintain an electrically continuous state. As a result, the collector voltage of the phototransistor 21 is at L, which, in turn, sets the input side of the NOR gate IC 101 to L. Consequently, the output side is normally at H. In addition, with the output of the NOR gate IC 101 at H, a transistor 102 becomes electrically continuous, setting the red light emitting diode 68 in the on state. Note that an F336HD is used for the light emitting diode 68. Also, an RN1007 is used to constitute the circuit that includes the transistor 102, indicated with the one-point chain line in FIG. 8.

If termites enter the longitudinal holes 53a and the output wave of a light emitting diode 20 is blocked in the state described above, the base input to the phototransistor 21 positioned opposite from the light emitting diode 20 ceases, cutting off the electrical continuity of the phototransistor 21 and generating a voltage at the collector side of the phototransistor 21. With this, at least one of the terminals at the input side of the NOR gate IC 101 is set to H and the output signal from the NOR gate IC 101 shifts from H to L.

This causes the base voltage at the transistor C102 to shift from H to L, to cut off the electrical continuity of the transistor 102, turning off the red light emitting diode 68. Thus, it becomes possible to specify the position of the termite detection apparatus 7 where termites have been detected.

In addition, since the gate voltage at a transistor 103 is also set to L, the electrical continuity of the transistor 103 ceases and the collector terminal shifts from L to H. This causes a phototransistor (TLP521, for instance) 104 to become electrically continuous and the voltage at a sensor signal line S1 of the connecting cable 9 shifts from H to L. With this, the output signal from the termite detection apparatus 7 on the sensor signal line S1 shifts from H to L, to communicate the detection of the termites.

Signals (H→L) from the sensor sections 5 of the termite detection apparatuses 7 positioned at various locations under the floor of and around the house are sent to the relay device 3 via the sensor signal lines S1 (S11, S12, S13, S14) of the connecting cables 9. Note that the electrical circuit inside the relay device 3 is as shown in FIGS. 9 and 10 and to accommodate the drawing presentation it is divided by using coupling elements P3~P6.

Figure 9:
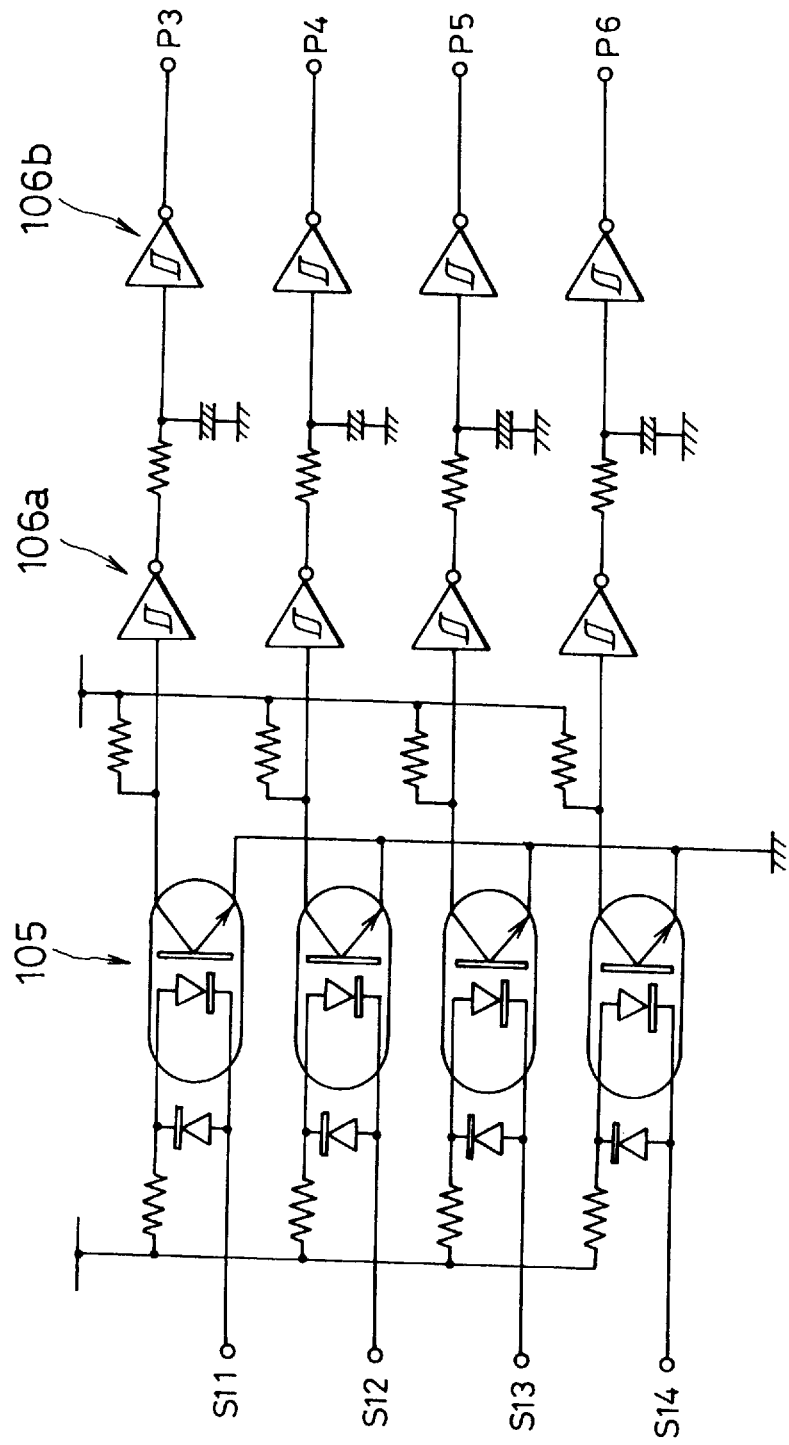
FIGS. 9 and 10 are electrical circuit diagrams of a relay device.

Initially, when at least one of the sensor signal lines S1 (S11, S12, S13, S14) shifts from H to L in FIG. 9, a phototransistor 105 at the position corresponding to the signal line where the shift occurred, enters an electrically continuous state.

With this, the collector of the phototransistor 105 shifts from H to L and, as a result, the output side of a first Schmitt trigger IC 106a is set to H and the output side of a second Schmitt trigger IC 106b is set to L. This causes at least one of the terminals of the coupling elements P3~P6 to shift from H to L upon termite detection. Note that a 14584, for instance, may be used for the Schmitt trigger IC.

Figure 10:
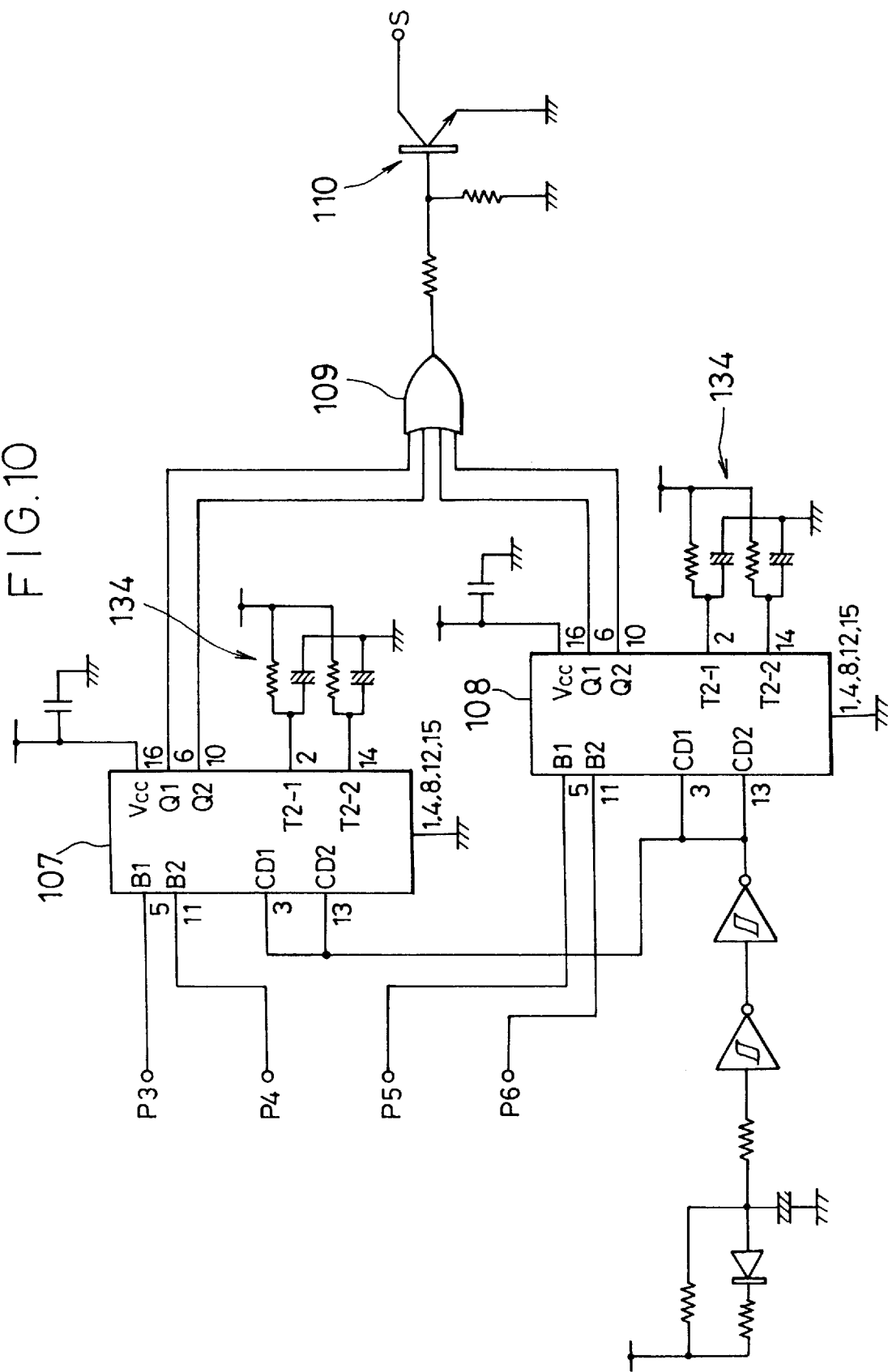
Figure 11:
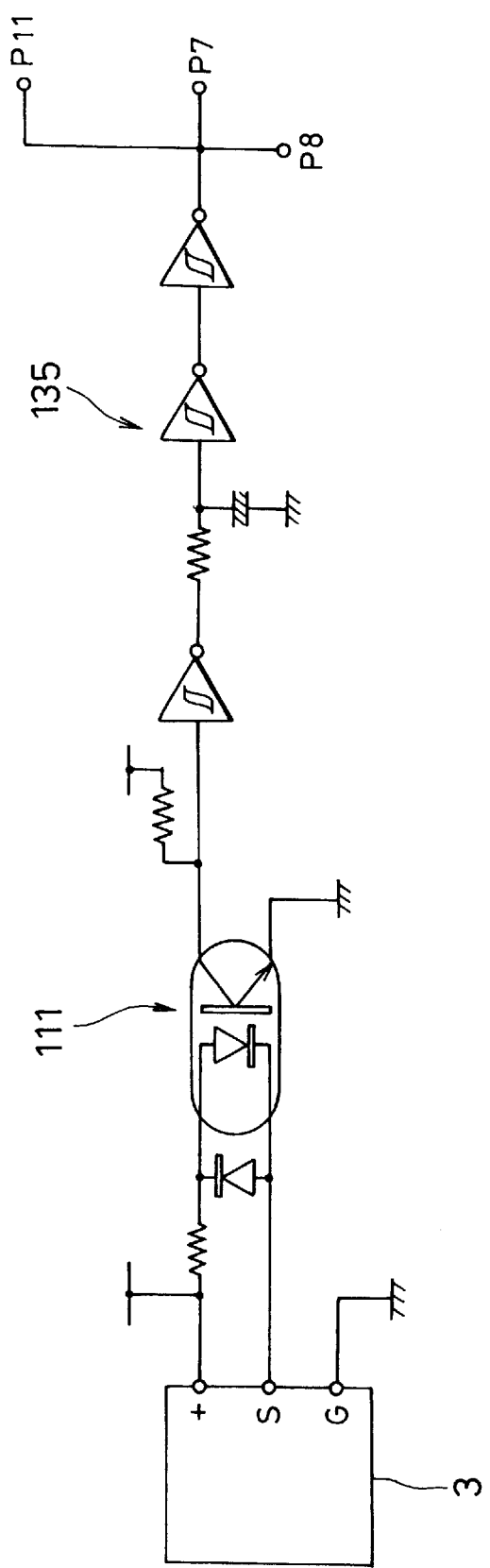
FIGS. 11~16 are electrical circuit diagrams of the alarm apparatus.

In addition, in FIG. 10, the coupling elements P3 and P4 are respectively connected to input terminals B1 and B2 of a monostable multivibrator IC 107 and the coupling elements P5 and P6 respectively are connected to input terminals B1 and B2 of a monostable multivibrator IC 108. With this, when at least one of the voltages at the terminals of P3~P6 shifts from H to L, an output signal is output from one of the output terminals Q1 and Q2 corresponding to the input terminals B1 and B2 with a pulse width set by a CR circuit 134. This signal is output to an input terminal of an OR IC 109. A 14072, for instance, may be used for this OR IC 109.

Thus, when termites have entered one of the various termite detection apparatuses 7 or, to be more specific, when termites have entered one of the longitudinal holes 53a of a sensor section 5, one of the signals at the input side of the OR IC 109 shifts from L to H and the output side of the OR IC 109 shifts from L to H. This causes a transistor 110 to become electrically continuous and the voltage at the sensor signal line S of the connecting cable 8 shifts from H to L.

As shown in FIGS. 1 and 2, the alarm device 2 is provided with a visual alarm section constituted with a numerical display portion 40 for displaying the number of termites and a read lamp portion 41 and an audio alarm section constituted with a speaker 132 which outputs an voice alarm warning of the detection of termites, and the circuit controlling these is shown in FIGS. 11 through 16. Note that the electrical circuit for the alarm device 2, shown in FIGS. 11 through 16 is also divided using coupling elements P7, P8, P9, P10 and P11 to accommodate the drawing presentation.

A phototransistor 111, which is connected from the relay device 3 through the sensor signal line S of the connecting cable 8, becomes electrically continuous when the voltage at the sensor signal line S shifts from H to L. With this, the output side of a circuit 135, which is constituted by connecting three Schmitt trigger ICs in series, shifts from L to H when the voltage at the collector side of the transistor 111 shifts from H to L. The output signal H is output to an audio control circuit shown in FIG. 14 via the coupling element P11 on the one hand and is also output to the circuit shown in FIG. 11 via the coupling elements P7 and P8 on the other.

Figure 12:
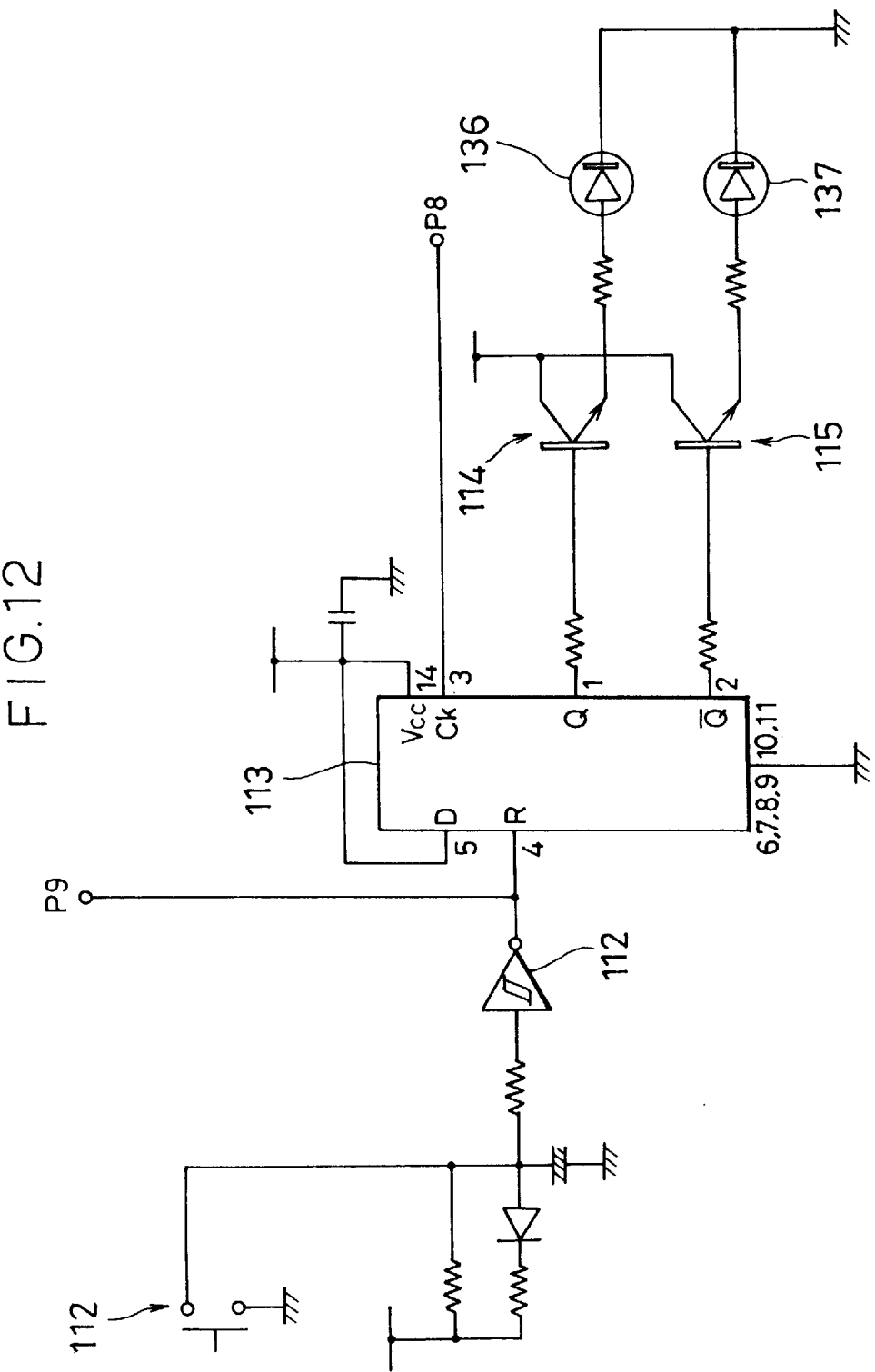

In FIG. 12, reference number 112 is a reset switch. When this reset switch 112 is turned on, the output side of a Schmitt trigger IC 112 (14584) shifts from L to H and the signal that has thus shifted from L to H is output to a counter IC 139 (FIG. 13), an IC 124 (FIG. 15) and an audio output circuit (FIG. 16) via a flipflop IC 113 and the coupling element P9.

In addition, in FIG. 12, a signal H generated at the collector side of the transistor 111 is input to a clock terminal (Ck) of the flipflop IC 113 via the coupling element P8. When the rise is detected of this collector side signal shifting from L to H, the output from an output terminal Q of the flipflop IC 113 shifts from L to H and the output of an output terminal Q bar shifts from H to L.

Normally, when no termites are detected, the output of the output terminal Q bar is at H and, consequently, a transistor 115 is electrically continuous and a green light emitting diode (VRPG5645) 137 is lit. However, when termites are detected and the clock terminal (Ck) shifts from L to H, the output from the output terminal Q is set to H, a transistor 114 becomes electrically continuous, a red light emitting diode 136 emits light and, at the same time, the output of the Q bar is set to L, turning off the green light emitting diode 137.

Thus, since the green light emitting diode 137 constituting the read lamp portion 41 goes off and instead the red light emitting diode 136 (VRPG15645) also constituting the read lamp portion 41 comes on, upon detection of termites, the detection of termites can also be indicated at the read lamp portion 41.

Figure 13:
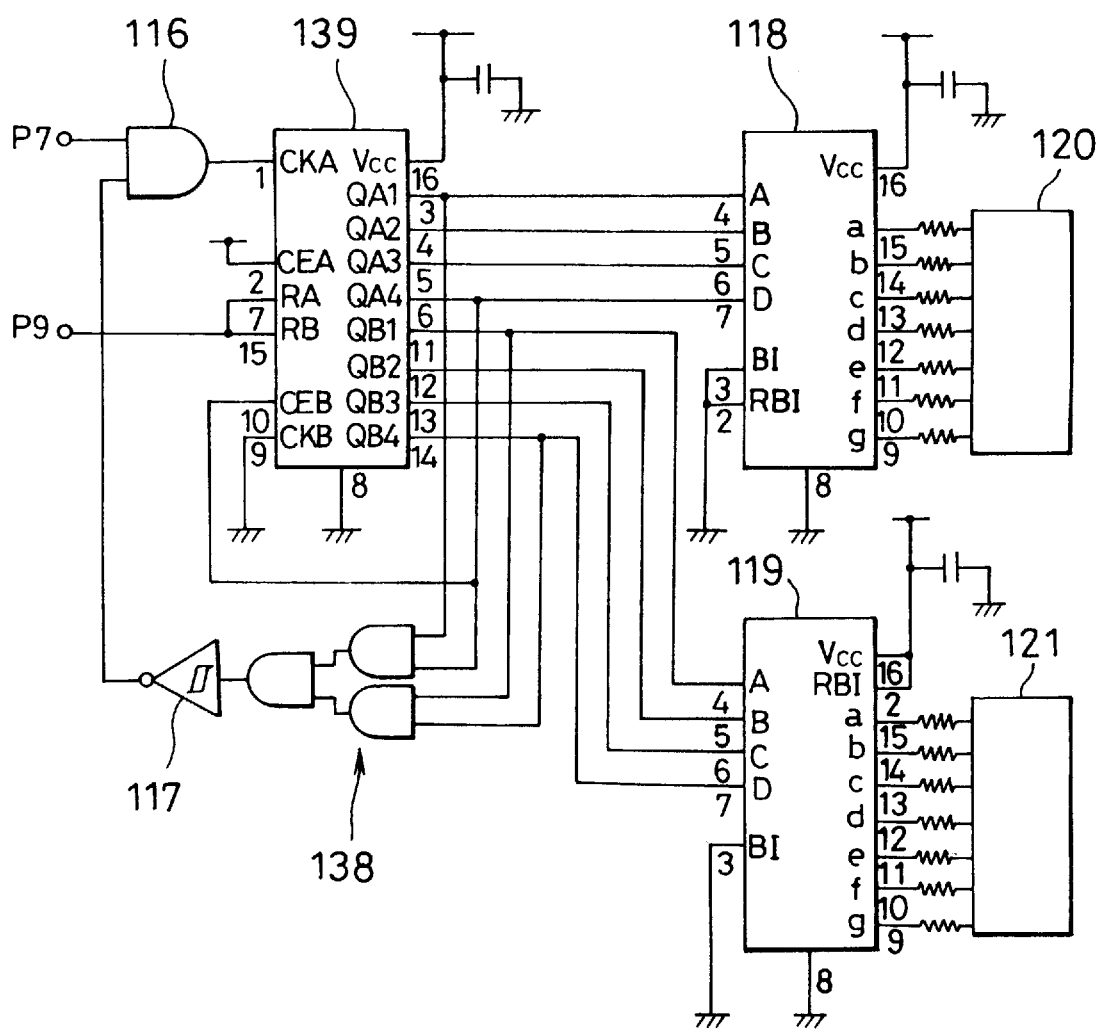

In addition, in FIG. 13, the output of the coupling element P7, which shifts from L to H when termites are detected, is input to an AND gate IC (148081, for instance) 116. Moreover, at another input side of the AND gate IC 116, the outputs of an AND gate 138 and a Schmitt trigger IC 117 are input. Normally, the output of the Schmitt trigger IC 117 is set to L only when the output sides of a counter IC 139 (14518, for instance) are all at H.

Thus, with the signal from the coupling element P7 set to H, the output side of the AND gate 116 shifts from L to H and the number of these shifts from L to H is counted at the counter IC 139. The count is output to a numerical display circuit constituted with 7-segment decoders (5022, for instance) 118 and 119 and 7-segment indicators (NKG261PB) 120 and 121 so that the number of termite detections can be indicated at the numerical display portion 40. Note that since, when the number of termite detections exceeds 99, the output from the Schmitt trigger IC 117 is set to L, the output side of the AND gate 116 is set to L at all times, stopping the counting performed by the counter IC 139.

Figure 14:
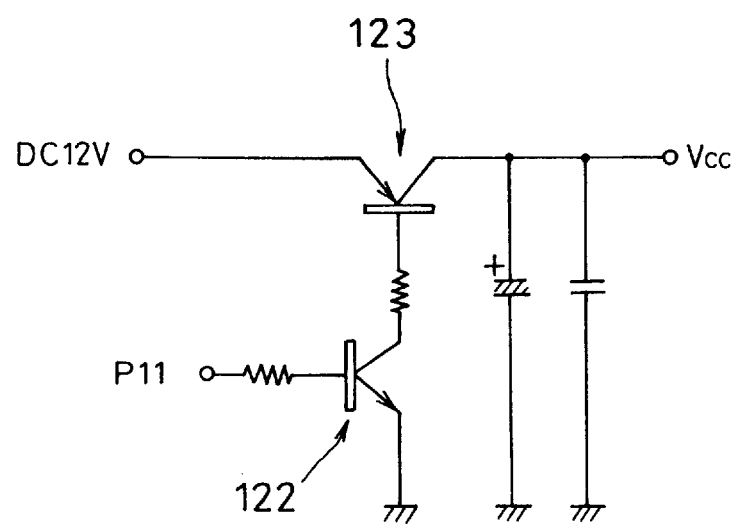
Figure 15:
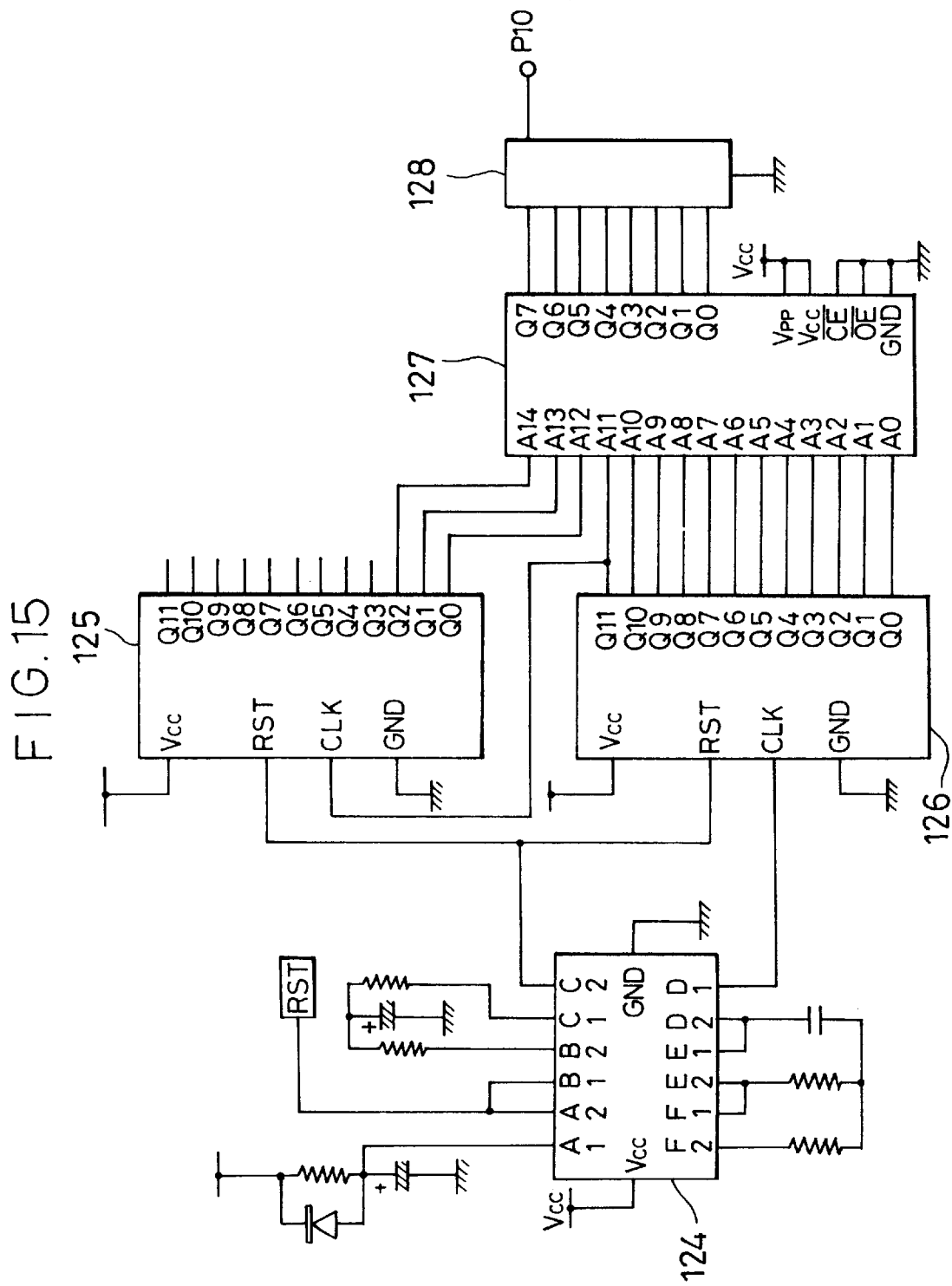
Figure 16:
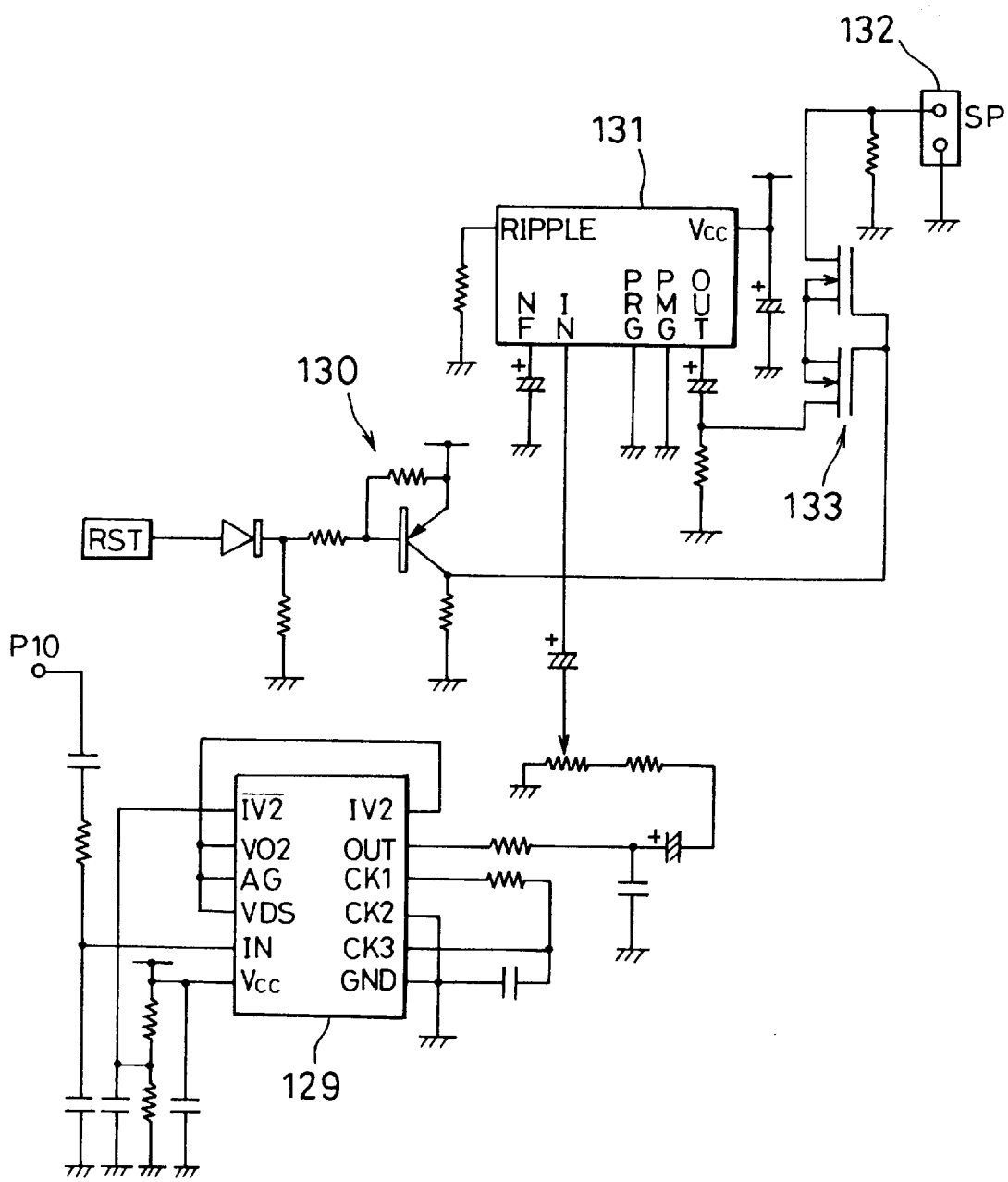

FIGS. 14 through 16 show the circuit of the audio section. Initially, in FIG. 14, a signal indicating termite detection is input from the circuit shown in FIG. 11 to a base terminal of a transistor 122 via the coupling element P11, setting the base terminal of a transistor 122 to H.

This causes the transistor 122 to become electrically continuous and this electrical continuity of the transistor 122 causes, in turn, the base voltage of a transistor 123 to step down, so that the transistor 123 becomes electrically continuous, thereby outputting an output voltage Vcc. This output voltage Vcc is supplied to the various portions shown in FIGS. 15 and 16 to start the operation of the audio section. Thus, the audio section starts operation upon receiving a signal indicating termite detection.

In addition, in reference to FIG. 15, when the output voltage Vcc is supplied, a custom IC 124 starts operating to output a specific clock to a first counter IC 126. This causes the first counter IC 126 to output a binary number to a ROM 127, and when the lower order 11 bits are exceeded, a second counter IC 125 starts operating to output the higher order 3 bits so that an output signal with a total of 14 bits is output to the ROM 127. The ROM 127 may be, for instance, a UV-EPROM 27C 256, and it outputs a programmed digital signal in conformance to the 14-bit binary number. Then, the digital signal output from the ROM 127, which will eventually be converted to an audio signal, is first converted to an analog signal at a D/A converter 128, is then input to a custom IC 129 shown in FIG. 16 via the coupling element P10 and is converted to a specific audio signal.

Next, this audio signal is input to and amplified at an audio power amplifier (TA7368P, for instance) 131 and is output to the speaker 132 via a pair of N-channel power MOSFETs 133. With this, when termites are detected, a voice announcement stored in the ROM 127 such as "termites have been detected" or the like is made through the speaker.

Note that a reset signal (RST) generated when the reset switch 112 is pressed, is input to the counter ICs 125 and 126 via the IC 112 shown in FIG. 15 on the one hand, resetting the counter ICs 125 and 126 to their initial values and is, on the other hand, input to the base terminal of a transistor 130 shown in FIG. 16.

This raises the base voltage at the transistor 130 from L to H, the electrical continuity of the transistor 130 ceases and the collector voltage of the transistor 130 is set to L. As a result, the gate voltage of the N-channel power MOSFETs 133 provided between the audio power amplifier IC 131 and the speaker 132 is set to L, releasing the electrical continuity so that the voice announcement on the speaker 132 is stopped. In the structure described above, when an infestation of termites is detected at a sensor section 5, the light emitting diode 68 mounted at the case 6 of the termite detection apparatus 7 goes off and then the read lamp portion 41 of the alarm device 2 turns from green to red. Then, the count of signals detecting the presence of termites is indicated at the display section 40, and the voice signal is output from the speaker 132 to inform the resident of the infestation. The resident, upon learning of the infestation, can cancel the alarm by pressing the reset switch 112.

While the detection portion 53 employs emitting elements 20, which emit an infrared ray, in the embodiment described above, the emitting elements may emit visible light, an electromagnetic wave, an acoustic wave or a laser beam and then receiving elements 21 must be selected to correspond to the emitting elements 20. In other words, the only requirements that the detection portion 53 must satisfy are that it be provided with an emitting source that emits a specific output and a receiving portion that receives the output and that it detect a change at the receiving portion that is caused when the output generated at the emitting source is blocked by termites. Furthermore, the detection portion 53 may be constituted as a sonar, in which output waves are generated at specific intervals from the emitting source and the reflected waves of these output waves are received at the receiving portion so that a change in the emitted waves caused by an infestation of termites or the like can be detected.

In addition, while, in the embodiment described above, the attractant members are formed from wood material, such as pine, which contains cellulose, the attractant members may also be constituted by solidifying pulp or may be constituted with a material that has an odor attractive to termites. In addition, the attractant members must have a degree of moisture, which termites require.

Moreover, an emitting device that emits an acoustic wave within a frequency range that attracts termites may be mounted at the attractant members, and the emitting device itself may be used as a means for attraction.

As has been explained, with the termite detection apparatus according to the present invention, since the sensor section is constituted with a case, an attractant member provided inside the case and a detection portion, which is provided with a means for detection where the attractant member is positioned, and a sensor cover enclosing an area surrounding the sensor section is provided, termites that are attracted by the attractant member, are detected by the means for detection when they enter, and the sensor cover keeps out other insects. As a result, an infestation of termites can be detected reliably. In addition, by further placing the attractant member and the detection portion in the case, the means for detection can be protected from moisture and the like, making operation over a long period of time possible.

Furthermore, since the termite alarm unit employing the termite detection apparatus described above is constituted with an alarm section provided on or above the floor, a relay device connected to the alarm section and a plurality of detection apparatuses connected to the relay device, its alarm section can be placed at a position where it can be seen easily and the relay device can be installed at a position on or above the floor or under the floor where it does not get in the way, which will simplify the wiring at the floor. Furthermore, when the detection sections are installed under the floor of, and around a house, too, they have only to be connected to the relay device, facilitating installation of a plurality of detection apparatuses at specific positions.

Also, with the alarm section provided with an audio alarm section that employs voice and a visual alarm section that employs a visual indication, it is possible to notify the resident of a termite infestation in a reliable manner.

Moreover, with the sensor sections of the detection apparatuses buried at a specific depth, termites, which avoid dry conditions, are more likely to enter from underground, improving the efficiency of termite detection.

Figure 17A:
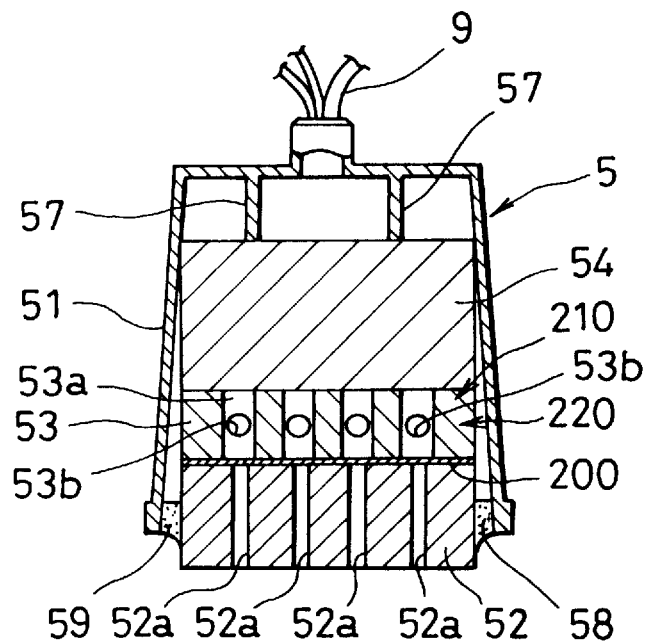
FIG. 17A is a cross section of the sensor section of the termite detection apparatus in another embodiment according to the present invention.
Figure 17B:
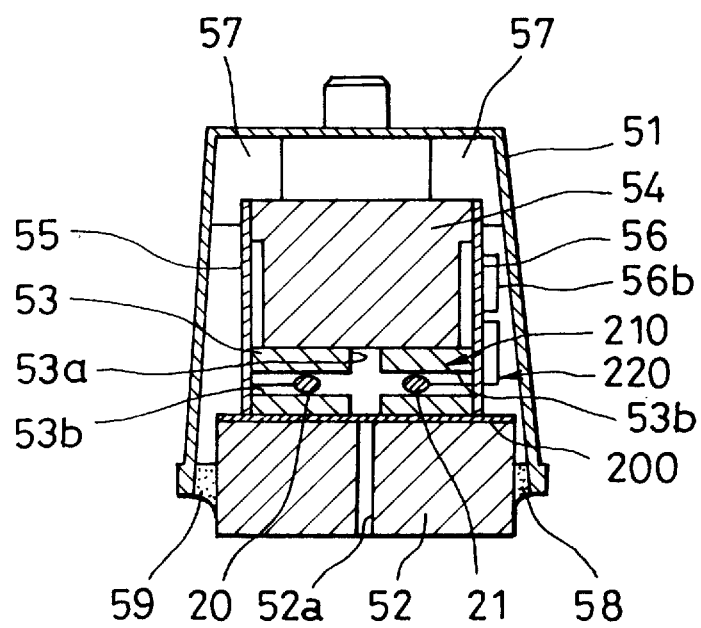
FIG. 17B is a cross section through an intersecting plane running vertical to the plane shown in FIG. 17A.
Figure 18:
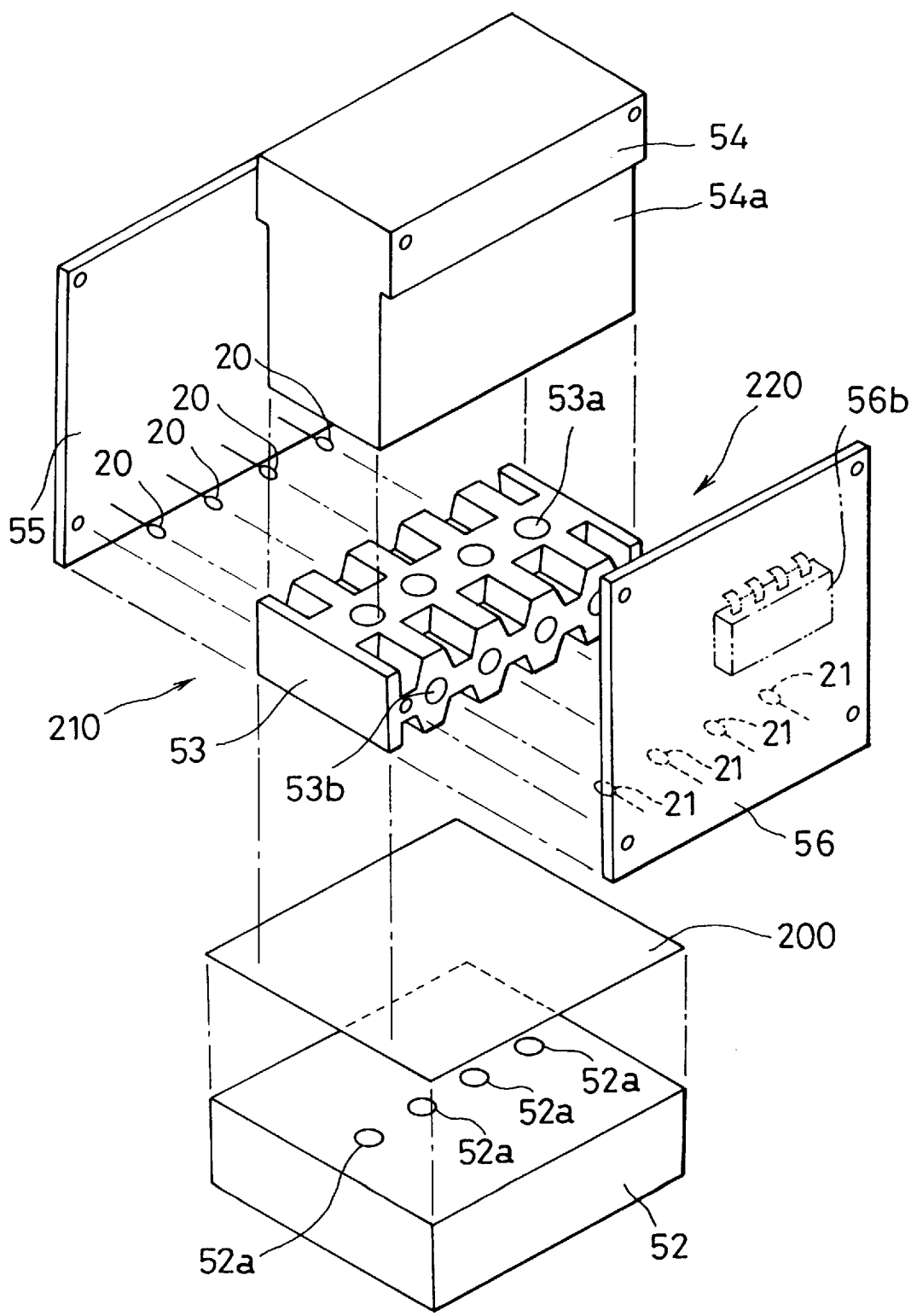
FIG. 18 is an exploded perspective showing the inside of the sensor section of the termite detection apparatus in another embodiment according to the present invention.

A sensor section 5 of a termite detection apparatus 7, shown in FIGS. 17A, 17B and 18, is constituted with a case 51, a first attractant member 52, a detection portion 220 and a second attractant member 54. The case 51 is formed from a synthetic resin and is formed in a temnocephalida truncated pyramid shape and is hollow inside. The case 51 has an opening portion 58 at the lower portion and at its upper end, a take out portion is formed, where the cables 9 are lead out. Inside the case 51 it is provided with securing ribs 57 for the second attractant member 54.

The first attractant member 52 and the second attractant member 54 mounted inside the case 51 are formed using a material containing cellulose, which attract termites, or the like and, more specifically, they may be formed from wood material such as pine, evergreen oak, white cedar, Japanese cryptomeria or the like, or they may be constituted with sawdust produced during saw milling, a waste material or the like pulverized into sawdust and then solidified or solidified recycled pulp. Furthermore, they may be constituted with a synthetic resin in which cellulose or a cellulose containing material is mixed or with a member to which cellulose odor is added.

Furthermore, since it has been confirmed that termites enter the first attractant member 52 by traveling in the ground, it is desirable to embed the first attractant member 52 in the ground at a specific depth, and to achieve this, the first attractant member 52 is secured to the case 51 in such a manner that it extends out from the case 51 over the portion which is buried in the ground. Normally, the first attractant member 52 is secured to the case 51 with screws. In addition, a plurality of induction holes 52a that pass through in the vertical direction are formed in the first attractant member 52 to ensure that termites can easily enter from underground.

In addition, a sealing member 59 is employed to seal the area between the first attractant member 52 and the case 51 to ensure that the moisture in the ground does not enter the case 51. This protects the electrical parts 56*b* and the like provided inside the case 51 from the humidity and makes it possible to implement electrical detection of termites on a long term basis.

Note that while four induction holes 52*a* are formed linearly in this embodiment, the number of induction holes and their positions are not restricted. However, although induction holes 52*a*, which open at the lower surface of the first attractant member 52, which is buried in the ground, may be provided randomly or alternately, induction holes 52*a* can be formed in the simplest manner when they are provided linearly over specific intervals due to the relationship with the detection portion 220 which is to be detailed below.

The detection portion 220 is provided above the first attractant member 52. The detection portion 220 is actually constituted with two detection portions for detecting an infestation of termites, i.e., a physical trace detection portion 200 and an electrical detection portion 210. The physical trace detection portion 200 is constituted with a film that covers the upper surface of the first attractant member 52. The film 200 should be thin and preferably the type that can be broken easily, and it is desirable to form the film 200 in a thin film using paper or material containing cellulose. Note that while, in this embodiment, the film 200 is provided to block off all the opening ends of the induction holes 52*a* toward the detection portion 220, one of the induction holes 52*a* may be left uncovered and open to accommodate verification of operation of the electrical detection portion 210.

The electrical detection portion 210 is provided on top of the film 200. This electrical detection portion 210 is constituted with a block 53 and a pair of printed circuit boards 55 and 56 that are provided at the sides of the block 53 to secure the block 53 and the second attractant member 54, with a plurality of longitudinal holes (1st holes) 53*a* that communicate with the individual induction holes 52*a* and a plurality of transverse through holes (2nd holes) 53*b* that intersect the longitudinal holes 53*a* at a right angle formed at the block 53. An emitting element 20 is inserted into each transverse hole 53*b* of the block 53, projecting out from the printed circuit board 55 from one side and a receiving element 21 projecting out from the printed circuit board 56 is inserted from the other side so that the emitting element 20 and the receiving element 21 face opposite each other across the longitudinal hole 53*a*.

While, in this embodiment, the emitting element 20 is constituted with an infrared ray emitting diode and the receiving element 21 is constituted with a phototransistor, the emitting element 20 may emit acoustic waves, ultrasonic waves, electromagnetic waves or a laser beam, and the only requirements that the receiving element 21 must satisfy are that it receives a signal emitted from the emitting element 20 and that it be capable of detecting that the signal has been blocked.

The sensor section 5, structured as described above, is placed at a specific location under the floor of, or around a house as in the embodiment described earlier, enclosed by the sensor cover 6 to constitute the termite detection apparatus 7. Prior to installation of the termite detection apparatus 7, in order to check the detection state of the electrical detection portion 210, a rod for checking is inserted into one of the induction holes 52*a*. At this time, the film at the induction hole 52*a* where the rod for checking has been inserted will be broken, and the position at which the damage occurred during this operation check should be marked or only an induction hole 52*a* at a specific position should be used for the operation check. Note that by scattering attractant chips (wood pieces, sawdust or the like) around the termite detection apparatus 7 as supplementary attractant members for termites, the likelihood of attracting termites that have entered toward the termite detection apparatus 7 can be improved.

Figure 19:
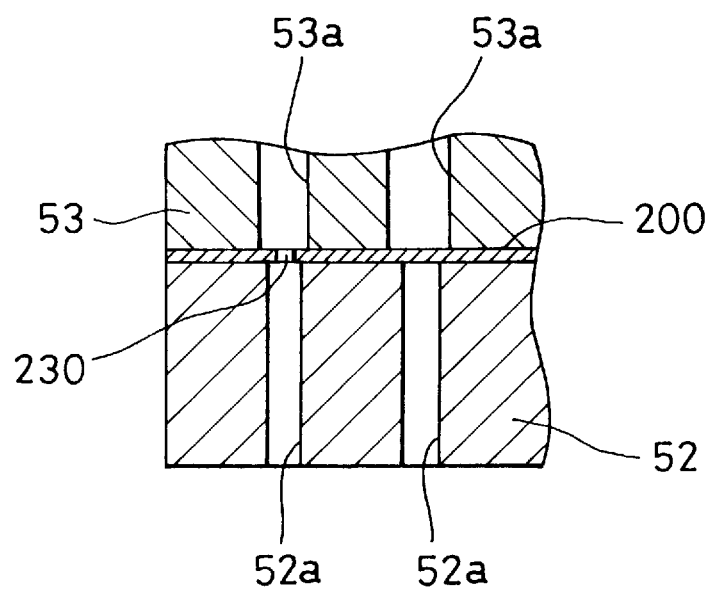
FIG. 19 is a partial enlarged cross section showing damage to a film.

With the termite detection apparatus 7 installed as described above, when termites travel underground and reach under the floor of, or around a house, they are attracted to the termite detection apparatus 7 by the attractant chips placed around the termite detection apparatus 7 and the first attractant member 52. Then, they reach from underground to the induction holes 52*a* formed at the first attractant member 52, and attracted by the second attractant member 54 and the film 200, they travel upward through the induction holes 52*a*. Then, as shown in FIG. 19, they eat through the film 200, which functions as the physical trace detection portion, before reaching the electrical detection portion 210, and leave a physical trace (reference number 230 in FIG. 19). After this, they reach the longitudinal holes 53*a* and move through them toward the second attractant member 54. At this point, they block the signal from an emitting element 20, changing the signal reaching the receiving element 21 to enable electrical detection of the termite infestation. Consequently, the termite alarm unit 2, to which the termite detection apparatus 7 is connected, notifies the resident of the infestation of termites.

Subsequently, the various termite detection apparatuses 7 placed at specific positions under the floor of, or around the house are inspected by the resident or by an exterminator who, upon being contacted by the resident, visits the site to handle the extermination. At this time, the exterminator or the resident can visually check for any physical trace 230 left by termites when they eat through the film by looking into the induction holes 52*a* of the sensor sections 5 to verify that the alarm issued by the electrical detection portion 210 in regard to the infestation of termites has not been made erroneously. Then, the exterminator will exterminate the termites to protect the house from infestation.

As has been explained, according to the present invention, since a film is provided to constitute a means for physical trace detection between the first attractant member and the electrical detection portion and the end portions of the induction holes formed in the first attractant member are blocked by the film, termites that have entered will have broken the film before reaching the electrical detection portion. Thus, by looking into the induction holes to check for any damage to the film, a physical trace of the infestation of termites can be observed. In addition, it is possible to make a judgment as to whether or not the electrical detection portion has operated erroneously. Furthermore, since a trace of termite entry has been left, proof of termite infestation can be obtained.

What is claimed is:

1. A termite detection apparatus comprising:
   a sensor section comprising a case to be provided at a location under a floor of, or around a house, with an opening portion at a lower end, an attractant member exposed from said opening portion of said case, a detection portion provided at said attractant member, and a detection means for detecting termites that have been attracted by said attractant member;
   a sensor cover that encloses an area surrounding said sensor section;

wherein said attractant member comprises a first attractant member and a second attractant member clamping said detection portion, said first attractant member extending out from said opening portion over a specific width and said first attractant member being provided with a plurality of induction holes opening at a lower surface; and wherein said detection portion is provided with first holes communicating with said induction holes and second holes intersecting said first holes, and wherein said detection means comprises an emitting element and a receiving element provided at each of said second holes.

2. A termite detection apparatus according to claim 1, wherein:

said attractant member contains cellulose.

3. A termite detection apparatus according to claim 1, wherein:

an area between said attractant member and said opening portion of said case is sealed with a sealing member.

4. A termite detection apparatus according to claim 1, wherein:

said emitting element emits light.

5. A termite detection apparatus according to claim 1, wherein:

said emitting element emits electromagnetic waves.

6. A termite detection apparatus according to claim 1, wherein:

said emitting element emits acoustic waves.

7. A termite detection apparatus according to claim 1, wherein:

said detection portion comprises a synthetic resin with a specific hardness.

8. A termite detection apparatus according to claim 1, wherein:

an indicator portions for indicating an operating state of said sensor sections is provided at said sensor cover.

9. A termite detection apparatus comprising:

a sensor section comprising a case to be provided at a location under a floor of, or around a house, with an opening portion at a lower end, an attractant member exposed from said opening portion of said case, a detection portion provided at said attractant member, and a detection means for detecting termites that have been attracted by said attractant member;

a sensor cover that encloses an area surrounding said sensor section;

wherein said attractant member comprises a first attractant member and a second attractant member clamping said detection portion, said first attractant member extending out from said opening portion over a specific width and said first attractant member being provided with a plurality of induction holes opening at a lower surface; and wherein a plurality of induction holes are formed at said attractant member, said plurality of induction holes opening at a lower surface of said attractant member; and wherein said detection means comprises a sonar provided at upper ends of said induction holes formed at said attractant member.

10. A termite detection apparatus according to claim 9, wherein:

said attractant member extends out from said opening portion of said case over a specific width.

11. A termite detection apparatus comprising:

a sensor section comprising a case to be placed at a specific position under a floor of, or around a house, said case being provided with an opening portion at a lower end, a first attractant member extending out from said opening portion of said case over a specific width, said first attractant member being provided with a plurality of induction holes opening at a lower surface, a detection portion provided above said first attractant member, said detection portion being provided with first holes communicating with said induction holes and second holes intersecting said first holes, and each of said second holes being provided with a detection mechanism including an emitting element and a receiving element, a second attractant member provided above said detection portion, and a sealing member that seals an area between said case and said first attractant member; and a sensor cover enclosing an area surrounding said sensor section, said sensor cover being provided with an indicator portion that indicates an operating state of said sensor section.

12. A termite detection apparatus according to claim 11, wherein:

attractant chips are scattered around said sensor section.

13. A termite detection apparatus according to claim 11 that is secured at a ground surface with a plurality of piles mounted to one of said attractant members.

14. A termite alarm unit comprising:

at least one termite detection apparatus comprising a sensor section including a case placed at a specific position under a floor of, or around a house, said sensor section being provided with an opening portion at a lower end, a first attractant member extending out from said opening portion of said case over a specific width, said first attractant member being provided with a plurality of induction holes opening at a lower surface, a detection portion provided above said first attractant member, said detection portion being provided with first holes communicating with said induction holes and second holes intersecting said first holes, each of said second holes being provided with a detection mechanism including an emitting element and a receiving element, a second attractant member provided above said detection portion, and a sealing member that seals an area between said case and said first attractant member, and a sensor cover enclosing an area surrounding said sensor section, said sensor cover being provided with an indicator section that indicates an operating state of said sensor section;

a relay device that gathers termite detection signals sent from said at least one termite detection apparatus to output a termite presence signal; and an alarm section installed at a specific location, which receives the termite presence signal from said relay device and comprises an audio alarm section that issues a voice alarm to notify of an infestation of termites and a visual alarm section that visually indicates said infestation of termites.

15. A termite detection apparatus comprising:

a case to be placed at a specific position under a floor of, or around a house, said case being provided with an opening portion at a lower end;

a first attractant member projecting out from said opening portion of said case over a specific width, said first attractant member being provided with a plurality of induction holes opening at a lower surface;

an electrical detection portion provided above said first attractant member, said electrical detection portion being provided with first holes communicating with said induction holes and second holes intersecting said first holes, said second holes each having an emitting element and a receiving element provided facing opposite each other across one of said first holes;

a second attractant member provided above said electrical detection portion;

a sealing member that seals an area between said case and said first attractant member; and a means for physical trace detection provided between said first attractant member and said electrical detection portion that detects physical traces of an infestation of termites.

16. A termite detection apparatus according to claim 15, wherein:

said means for physical trace detection comprises a film provided between said first attractant member and said electrical detection portion.

17. A termite detection apparatus according to claim 16, wherein:

said film blocks off end portions of said induction holes toward said electrical detection portion.

18. A termite detection apparatus according to claim 15, wherein:

said film leaves open end portions of said induction holes toward said electrical detection portion.

19. A termite detection apparatus according to claim 16, wherein:

said film comprises a cellulose containing member.

20. A termite detection apparatus according to claim 16, wherein:

said film comprises a cellulose containing member.

21. A termite alarm unit comprising:

at least one termite detection apparatus comprising a case to be placed at a specific position under a floor of, or around a house said case being provided with an opening at a lower end, a first attractant member projecting out from said opening portion of said case over a specific width, said first attractant member being provided with a plurality of induction holes opening at a lower end, an electrical detection portion provided above said first attractant member, said electrical detection portion being provided with first holes communicating with said induction holes and second holes intersecting said first holes, each of said second holes having an emitting element and a receiving element across a respective one of said first holes, a second attractant member provided above said electrical detection portion, and a sealing member which seals an area between said case and said first attractant member, which is further provided with a means for physical trace detection between said first attractant member and said electrical detection portion, which detects physical traces of an infestation of termites;

a relay device that gathers termite detection signals from said at least one termite detection apparatus to output a termite presence signal; and an alarm section installed at a specific position, which receives the termite presence signal from said relay device and comprises an audio alarm section that issues a vocal alarm to notify of an infestation of termites and a visual alarm section that visually indicates said infestation of termites.

* * * * *